United States Patent
Akiyama et al.

(10) Patent No.: US 6,302,520 B1
(45) Date of Patent: *Oct. 16, 2001

(54) RECORDING APPARATUS, RECORDING METHOD AND CONTROL METHOD FOR RECORDING WITH REDUCED DRIVE LOAD

(75) Inventors: Yuji Akiyama, Yokohama; Fumihiro Gotoh, Kawasaki; Hidehiko Kanda; Hiromitsu Hirabayashi, both of Yokohama; Nobuo Ohnuma, Kawasaki, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 16 days.

(21) Appl. No.: 09/002,383

(22) Filed: Jan. 2, 1998

Related U.S. Application Data

(63) Continuation of application No. 08/250,814, filed on May 26, 1994.

(30) Foreign Application Priority Data

May 27, 1993 (JP) .................................................... 5-126184
May 13, 1994 (JP) .................................................... 6-099828

(51) Int. Cl.[7] ........................................................ B41J 2/21
(52) U.S. Cl. ................................. 347/43; 347/15; 347/40
(58) Field of Search ................................. 347/43, 10, 12, 347/40, 41, 9, 15

(56) References Cited

U.S. PATENT DOCUMENTS

| | | | |
|---|---|---|---|
| 4,313,124 | 1/1982 | Hara | 347/57 |
| 4,345,262 | 8/1982 | Shirato et al. | 347/10 |
| 4,459,600 | 7/1984 | Sato et al. | 347/47 |
| 4,463,359 | 7/1984 | Ayata et al. | 347/56 |
| 4,558,333 | 12/1985 | Sugitani et al. | 347/66 |
| 4,608,577 | 8/1986 | Hori | 347/56 |
| 4,723,129 | 2/1988 | Endo et al. | 347/56 |
| 4,740,796 | 4/1988 | Endo et al. | 347/56 |
| 4,833,491 * | 5/1989 | Rezanka | 347/43 |
| 5,146,236 * | 9/1992 | Hirata et al. | 347/12 |
| 5,155,503 | 10/1992 | Tasaki et al. | 347/12 |
| 5,166,708 | 11/1992 | Hirano et al. | 347/24 |
| 5,227,873 | 7/1993 | Chiba et al. | 358/521 |
| 5,359,355 | 10/1994 | Hirano et al. | 347/40 |
| 5,710,582 * | 1/1998 | Hawkins et al. | 347/43 |

FOREIGN PATENT DOCUMENTS

| | | |
|---|---|---|
| 54-56847 | 5/1979 | (JP) . |
| 59-123670 | 7/1984 | (JP) . |
| 59-138461 | 8/1984 | (JP) . |
| 60-71260 | 4/1985 | (JP) . |

* cited by examiner

*Primary Examiner*—N. Le
*Assistant Examiner*—Lamson Nguyen
(74) *Attorney, Agent, or Firm*—Fitzpatrick, Cella, Harper & Scinto

(57) ABSTRACT

A recording apparatus for performing recording on a recording medium by scanning the medium with a recording device having heads of a plurality of colors has a setting device for setting a color recording mode for recording a color image or a monochromic recording mode for recording a monochromic image, and a drive device having a first recording mode for driving the recording device while reducing a drive load on the recording device and a second recording mode for driving without reducing the drive load. The apparatus also has a determination device for determining the drive load with which the recording means is driven in a unit time on the basis of a data signal corresponding to a region of a scanning recording width of the recording device, and a changing device for changing the drive means into the first recording mode when the drive load determined by the determination device is large, and into the second recording mode when the drive load is small, if the color recording mode is set by the setting device.

39 Claims, 21 Drawing Sheets

FIG. 20A

FLAG n color F = TURE

| | PRESENT RASTER | |
|---|---|---|
| No, | COLOR/BLACK AND WHITE | DIVISIBLE/INDIVISIBLE BY B |
| 1, | COLOR | INDIVISIBLE |
| 2, | COLOR | DIVISIBLE |
| 3, | BLACK AND WHITE | INDIVISIBLE |
| 4, | BLACK AND WHITE | DIVISIBLE |

FIG. 20B

FLAG n color F = FALSE

| | PRESENT RASTER | |
|---|---|---|
| No, | COLOR/BLACK AND WHITE | DIVISIBLE/INDIVISIBLE BY B |
| 1, | COLOR | INDIVISIBLE |
| 2, | COLOR | DIVISIBLE |
| 3, | BLACK AND WHITE | INDIVISIBLE |
| 4, | BLACK AND WHITE | DIVISIBLE |

FIG. 21

| PRECEDING BAND | PRESENT BAND | PRESENT PRINTING MODE |
|---|---|---|
| COLOR | — | MODE 1 |
| BLACK AND WHITE | COLOR | MODE 1 |
| BLACK AND WHITE | BLACK AND WHITE | MODE 2 |

RECORDING APPARATUS, RECORDING METHOD AND CONTROL METHOD FOR RECORDING WITH REDUCED DRIVE LOAD

This application is a continuation of U.S. patent application Ser. No. 08/250,814, filed May 26, 1994.

BACKGROUND OF THE INVENTION

1. Field of the Invention

This invention relates to a printer and a printer driver capable of moving a recording medium in the form of an individually-cut sheet a rolled sheet, e.g., paper, cloth or a special sheet relative to a printing mechanism in different conditions of transport for pitch feed. In particular, the present invention can be applied to recording apparatuses, such as copying machines and facsimile machines, communication apparatuses, office apparatuses, and multipurpose apparatuses, which may include combinations thereof.

2. Description of the Related Art

Generally, in recording apparatuses connected to host computers and other units and capable of recording and outputting images, color recording and monochromic recording are performed separately from each other.

In multi-color recording, ink of three colors, i.e., yellow (Y), magenta (M), cyan (C), or four colors consisting of these colors and black (K) is used and the amount of ink is therefore liable to increase. Accordingly, the quality of a resulting recorded image is liable to deteriorate by blurring or the like. Further, it is necessary to drive recording heads for ejecting inks of three or four colors in a recording apparatus for such multi-color recording. Correspondingly, this necessitates an increase in the size of a power source for the recording apparatus.

A recording method using a fine mode has been provided to solve these problems. In this recording method, a recording portion of a head formed from a multiplicity of printing driver elements is divided into partial regions and an image is recorded on a recording medium in such a manner that one portion of the recording medium is scanned a given number of times with one set of the partial regions. In this recording, a thinned-out image is formed in each scanning cycle so that the corresponding complete image is completed by scanning the given number of times. According to this method, the amount of ink ejected in one scanning cycle is reduced, so that blurring in images is limited. Also, the number of driver elements driven at one time is reduced, which effect allows a reduction in the size of the power source for driving the head.

Even if such driving is performed, the period of time for recording a plurality of colors on a recording medium cannot be reduced, although improvements in image qualities and reductions in the size and the cost of the recording apparatus can be achieved. This is because the width of a portion of the recording medium on which an image is recorded by one scanning cycle is limited to the width of each partial region of the head.

SUMMARY OF THE INVENTION

An object of the present invention is to provide a data printing method, a driver and an ink recording apparatus arranged so that the time taken to perform multi-color or monochromic recording on a recording medium can be reduced substantially.

Another object of the present invention is to provide a data printing method, a driver and an ink recording apparatus arranged so that, even if the apparatus and the driver are originally designed for multi-color printing and recording, monochromic recording of a monochromic image or the like can be performed reliably at a high speed.

Still another object of the present invention is to provide a data printing method, a driver and an ink recording apparatus arranged to efficiently record an image even if the image is formed only by monochromic data or single-color data while a color mode for forming a multi-color image is selected, or even if monochromic data or single-color data of the image exists dispersively without mixing colors.

To achieve these objects, according to one aspect of the present invention, there is provided a recording apparatus for recording on a recording medium by scanning using recording means having plural heads for recording a plurality of colors, the apparatus comprising setting means for setting one of a color recording mode for recording a multi-color image and a monochromic recording mode for recording a monochromic image, drive means for driving, these drive means having a first recording mode for driving having a first recording mode for driving the recording means while reducing the drive load on the recording means and a second recording mode for driving the recording means without reducing the drive load, determination means for determining the drive load with which the recording means is driven in a unit time on the basis of a data signal corresponding to a region of a scanning recording width of the recording means, and changing means for changing the drive means to the first recording mode when the drive load determined by the determination means is large, and to the second recording mode when the drive load is small, if the color recording mode is set by the setting means.

According to another aspect of the present invention, there is provided a method for recording on a recording medium by scanning with recording means for recording having plural heads for recording a plurality of colors, the method comprising the steps of setting either a color recording mode for recording a multi-color image or a monochromic recording mode for recording a monochromic image, determining a drive load with which the recording means is driven in a unit time on the basis of a data signal corresponding to a region of a scanning recording width of the recording means, and driving the recording means in a first recording mode for driving by reducing the drive load on the recording means if the color recording mode is set by the setting step, and if it is determined in the determination step that the drive load is large, or in a second recording mode for driving without reducing the load on the recording means if the color recording mode is set, and if it is determined that the drive load is small.

According to still another aspect of the present invention, there is provided a method of recording on a recording medium by scanning with recording means for recording having plural heads for recording a plurality of colors, the method comprising the steps of setting one of a color recording mode for recording a multi-color image and a monochromic recording mode for recording a monochromic image, determining a drive load with which the recording means is driven in a unit time over each of a first region of a scanning recording width of the recording means and a second region adjacent to the first region on the basis of a data signal corresponding to the first and second regions, and driving the recording means in a first recording mode for driving by reducing the drive load on the recording means with respect to the second region if the color recording mode is set by the setting step, and if it is determined in the determination step that the drive load with respect to the second region is large, or in a second recording mode for driving without reducing the load if the color recording mode is set, and if it is determined that the drive load with respect to the first and second regions is small.

According to a further aspect of the present invention, there is provided a method of controlling the recording operation of a recording apparatus for recording on a recording medium by scanning with recording means for recording having plural heads for recording a plurality of colors, the method comprising the steps of setting one of a color recording mode for recording a multi-color image and a monochromic recording mode for recording a monochromic image, determining a drive load with which the recording means is driven in a unit time on the basis of a data signal corresponding to a region of a scanning recording width of the recording means, and driving the recording means in a first recording mode for driving by reducing the drive load on the recording means if the color recording mode is set by the setting step, and if it is determined in the determining step that the drive load is large, or in a second recording mode for driving without reducing the load on the recording means if the color recording mode is set, and if it is determined that the drive load is small.

BRIEF DESCRIPTION OF THE DRAWINGS

FIGS. 20A and 20B are tables depicting an example of a discrimination method in accordance with the first embodiment of the invention; and FIG. 21 is a table showing an example of discrimination processing in accordance with the first embodiment of the invention.

DESCRIPTION OF THE PREFERRED EMBODIMENTS

A recording apparatus and a method of controlling the recording apparatus in accordance with the present invention will be described in detail below with reference to the drawings.

(Embodiment 1)

Figure 1:
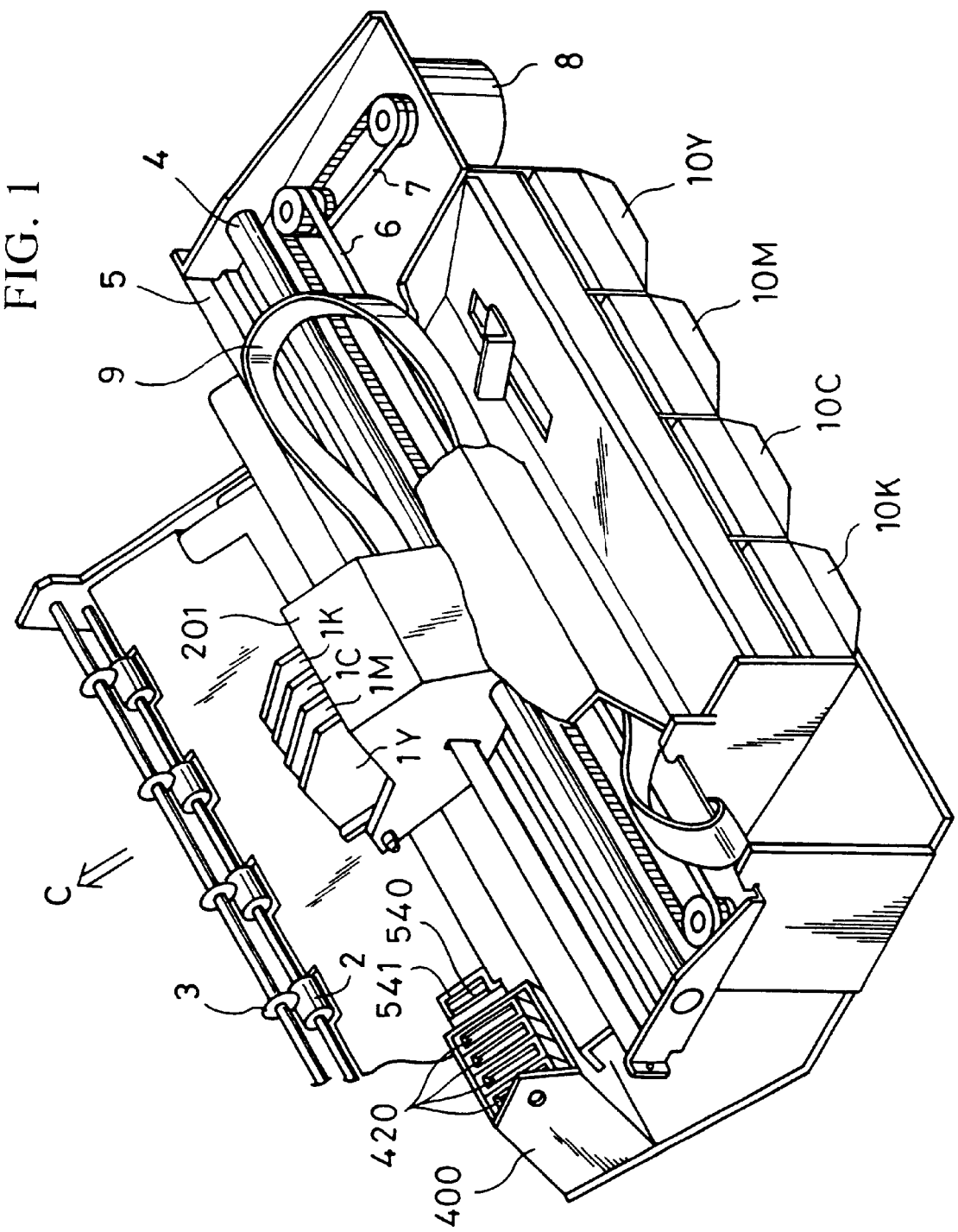
FIG. 1 is a diagram showing the construction of an essential portion of a serial scanning type color ink jet recording apparatus in accordance with a first embodiment of the present invention.

FIG. 1 is a perspective view of an essential portion of a serial scanning type color ink jet recording apparatus in accordance with an embodiment of the present invention.

A recording head 1Y for ejecting color ink of yellow (Y), a recording head 1M for ejecting color ink of magenta (M), a recording head 1C for ejecting color ink of cyan (C) and a recording head 1K for ejecting color ink of black (K) are disposed on a carriage 201 at predetermined intervals. A recording member on which characters, images or the like are to be recorded and which is formed of paper, a thin plastic sheet or the like is transported in the direction of arrow C by driving with a transport motor (not shown) while being pinched between transport rollers (not shown) and between discharge rollers 2 and 3. The carriage 201 is guided and supported by a guide shaft 4 and an encoder 5. The carriage 201 is driven by a carriage motor 8 through driving belts 6 and 7 to move reciprocatingly along the guide shaft 4.

Each recording head 1 has a plurality of nozzles formed in its surface (nozzle formation surface) facing the recording member. A heating element (electrothermal transducer) capable of generating thermal energy for ejecting ink is provided inside each nozzle (flow passage). The heating elements are driven on the basis of a recording signal in accordance with an encoder 5 reading timing to cause ink droplets to fly and strike the recording member in the order of black, cyan, magenta and yellow, thereby forming an image.

A recovery unit 400 having capping portions 420 forming four caps is provided at a home position of the carriage 201 set outside of a recording area. When recording is not performed, the carriage 201 is moved to the home position and the nozzle formation surface of each recording head 1 is tightly closed by the cap of the corresponding capping portion 420 to prevent clogging in the nozzles caused by thickening of ink due to evaporation of the ink's solvent or attachment of foreign matter such as dust.

A blade 540 and a wiping member 541 are disposed adjacent to the capping portions 420 and are used to clean the nozzle formation surface of each recording head 1.

Ink is supplied to each recording head 1 from an ink tank 10 via an ink tube 9 and through a sub tank (not shown).

The recording apparatus of this embodiment is arranged to record an image at a resolution of 360 dpi. Each recording head has 64 nozzles and can record data corresponding to a 64-dot width in one scanning cycle.

Figure 3:
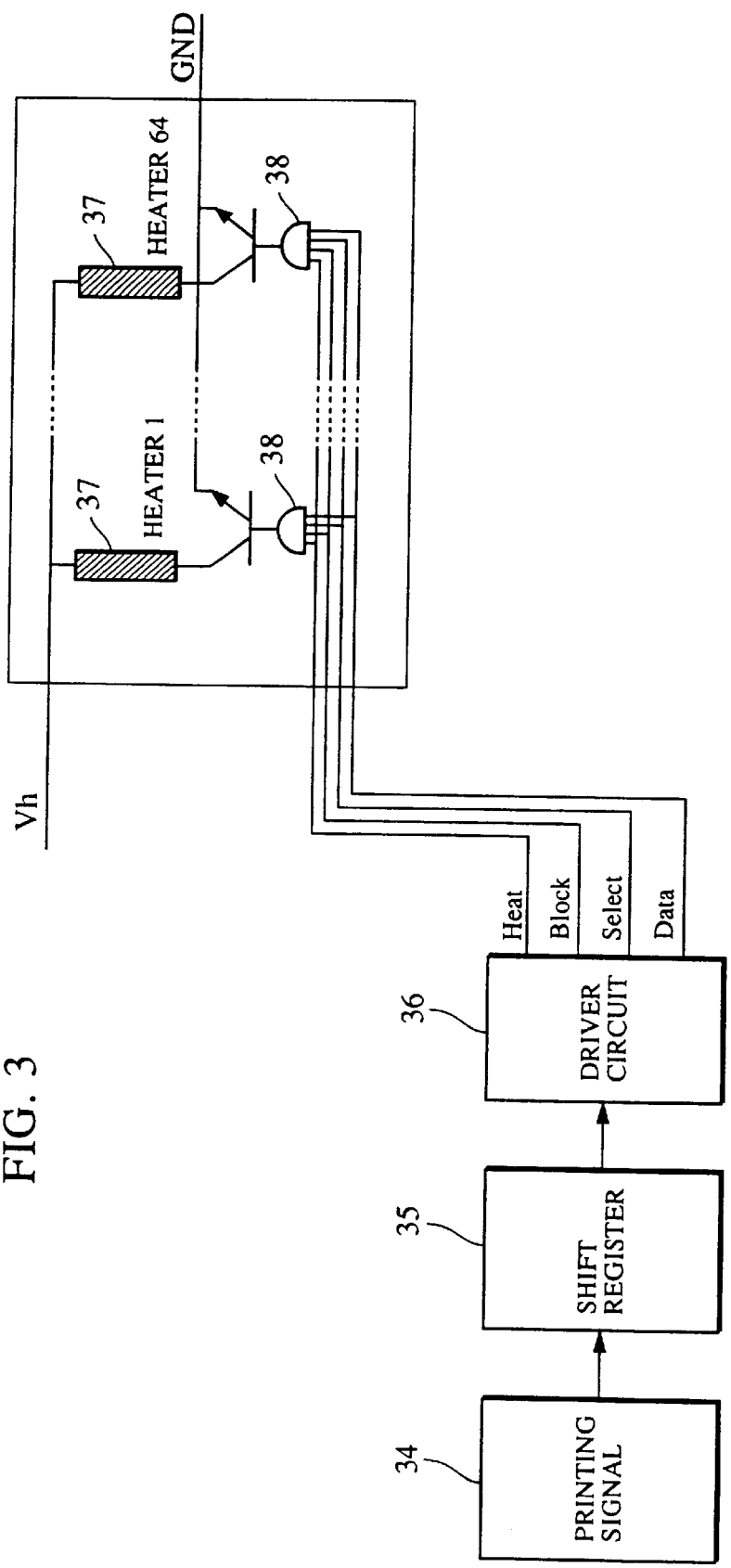
FIG. 3 is a block diagram of an electrical circuit for a drive control of each recording head in the first embodiment of the invention.

FIG. 3 shows an electrical circuit for controlling driving of the recording head in this embodiment.

A signal corresponding to a recording signal 34 is sent from a shift register 35 to a driver circuit 36. Signals, i.e., Heat pulses, Block pulses, Select pulses and Data pulses, are formed in the driver circuit 36 on the basis of the signal supplied from the shift register and are output from the driver circuit 36 to an associated logical operation device 38. The on-off operation of the heating elements (heaters) 37 in the nozzles of each recording head is controlled on the basis of the operation result output from the associated logical operation device 38. In this embodiment, a double pulse of the type disclosed in U.S. Ser. No. 821,773 by the applicant of this invention is adopted as each heating pulse.

In each recording head, the array of ink nozzles is divided into a plurality of rows to be driven separately, and groups of 8 heaters out of the 64 heaters are turned on and off sequentially according to the Block pulse signal to perform printing. In FIG. 3, a line Vh represents a common power supply line connected to the heaters, and a line GND represents ground.

Figure 4:
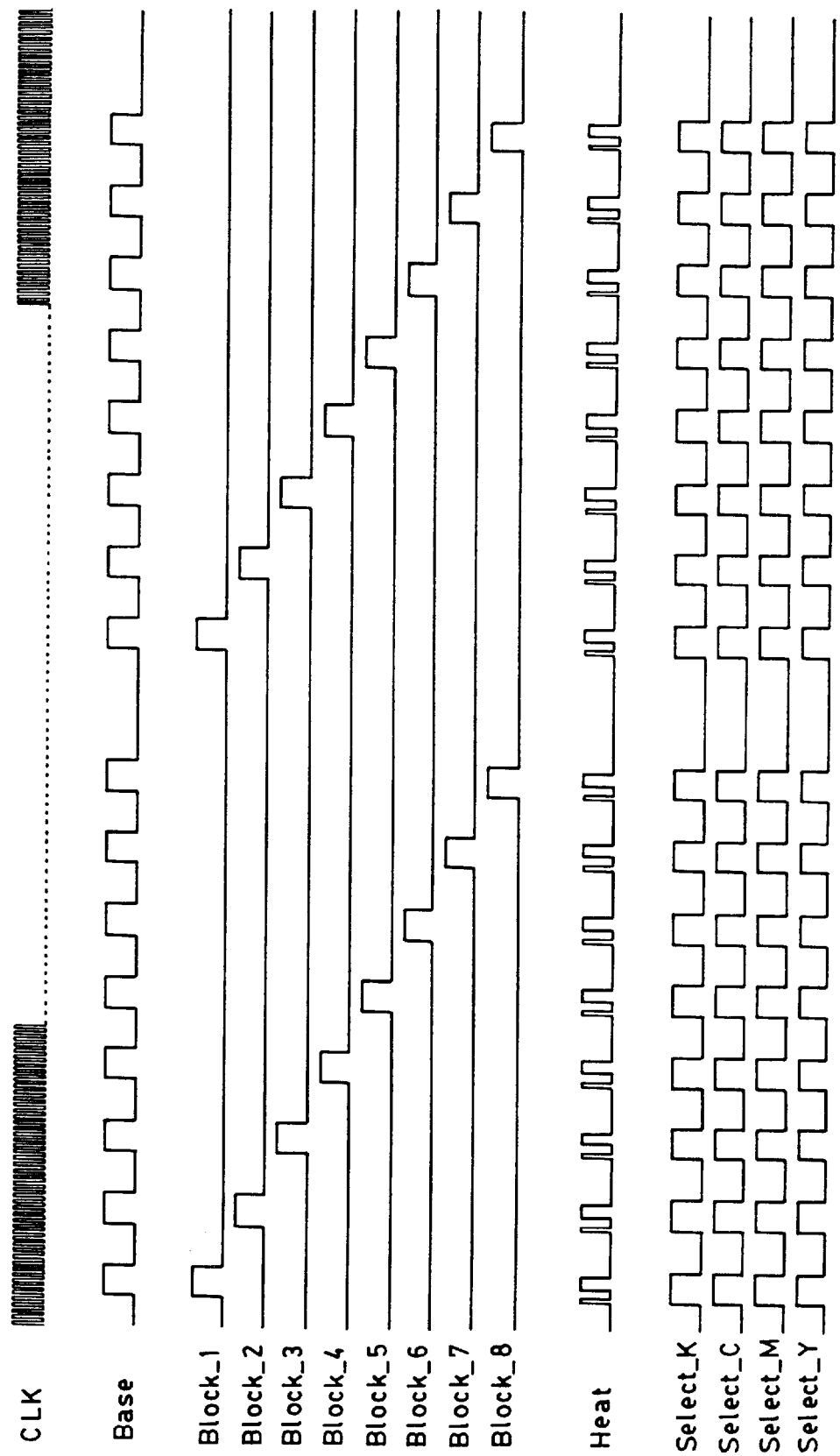
FIG. 4 is a waveform diagram showing the driving timing of conventional recording heads.

FIG. 4 is a waveform diagram showing the timing of conventional recording head driving.

As shown in FIG. 4, if each of the Heat pulse signal, the Block-1 to Block-8 pulse signals and the Select signal is high and if the Data pulse signal corresponding to a printing signal is also high, the heaters are turned on to eject ink, thereby recording an image. The Select pulses correspond to the ink colors, i.e., the recording heads of the respective colors. In this case, the Select pulses become high by the same timing with respect to the colors. In this case, if an image having the four colors is recorded, electric power (maximum power) for heating 32 heaters (8 heaters ×4colors) by the same timing is required, and electric power (average power) for heating 256 heaters (32 heaters ×8 blocks) is required with respect to one pixel width (1 recording period). Thus, the maximum amount of electric power required when all the heaters of the four-color recording heads are simultaneously turned on is very large and a large-capacity power source is therefore required. Thus, there has been the problem of an increased size and price of power sources in developing smaller low-priced recording apparatuses.

In the recording heads used in this embodiment and arranged to solve this problem, ink is ejected using the timing described below to reduce the load on the power source.

Figure 5:
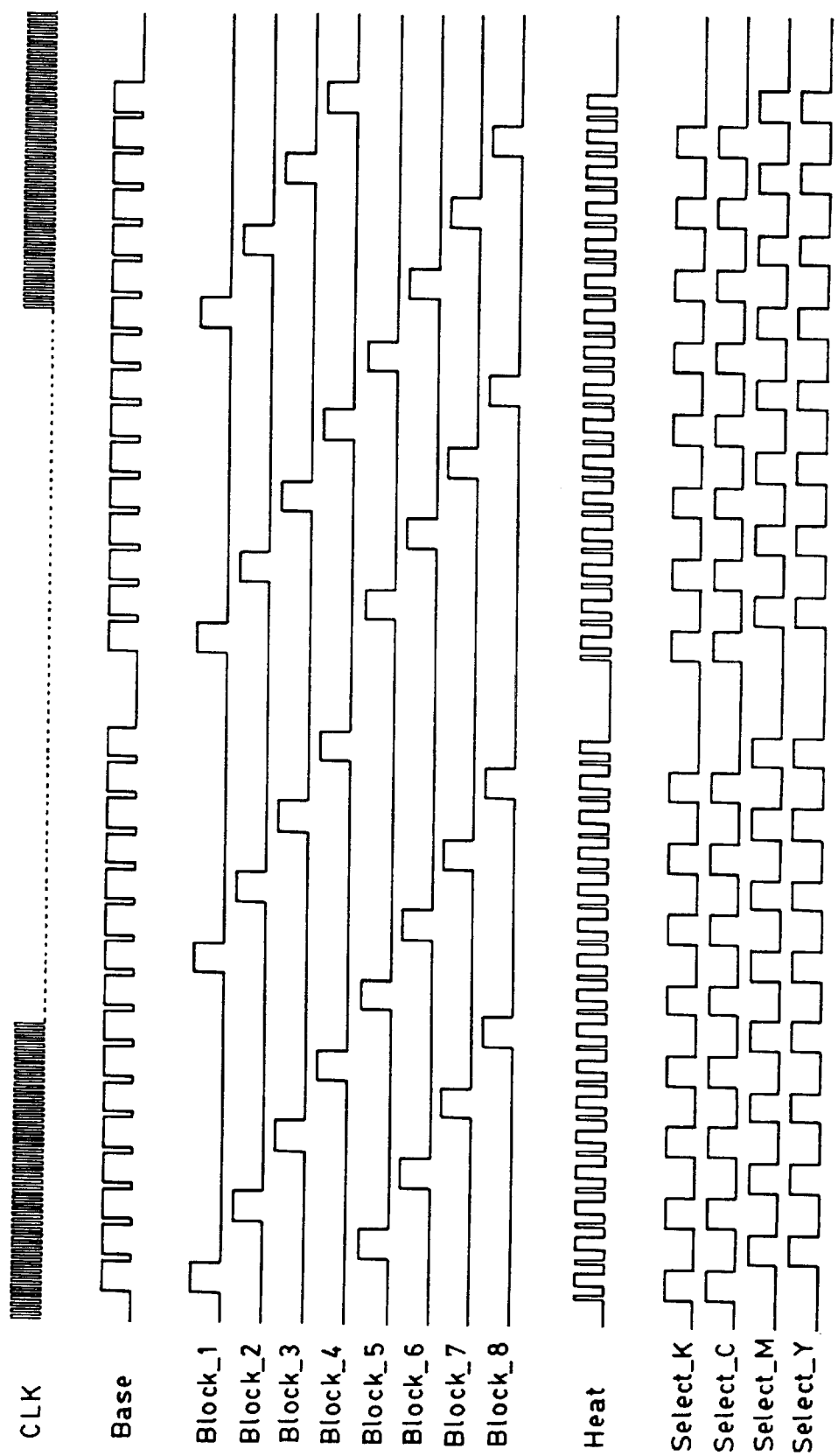
FIG. 5 is a waveform diagram showing a timing of driving the recording heads when color recording is performed in the first embodiment of the invention.

FIG. 5 is a waveform diagram showing a timing of driving the recording heads when multi-color recording is performed in this embodiment.

As shown in FIG. 5, if each of the Heat pulse signal, the Block-1 to Block-8 pulse signals and the Select signal is high and if the Data pulse signal corresponding to a printing signal is also high, the heaters are turned on to eject ink, thereby recording an image. The Select pulses correspond to the ink colors, i.e., the recording heads. In this case, the period of time when the Select-K pulse signal corresponding to the black recording head and the Select-C pulse signal corresponding to the cyan recording head are high and the period of time when the Select-M pulse signal corresponding to the magenta recording head and the select-Y pulse signal corresponding to the yellow recording head are high are set so as not to overlap each other. In this case, if an image having the four colors is recorded, electric power (maximum power) for heating 16 heaters (8 heaters ×2 colors) using the same timing is required, and electric power (average power) for heating 256 heaters (16 heaters ×16 blocks) is required with respect to one pixel width (1 recording period). Consequently, the maximum electric power required is reduced to half of that in the conventional arrangement even when four-color recording is performed, and the load on the power source is correspondingly reduced.

Figure 6:
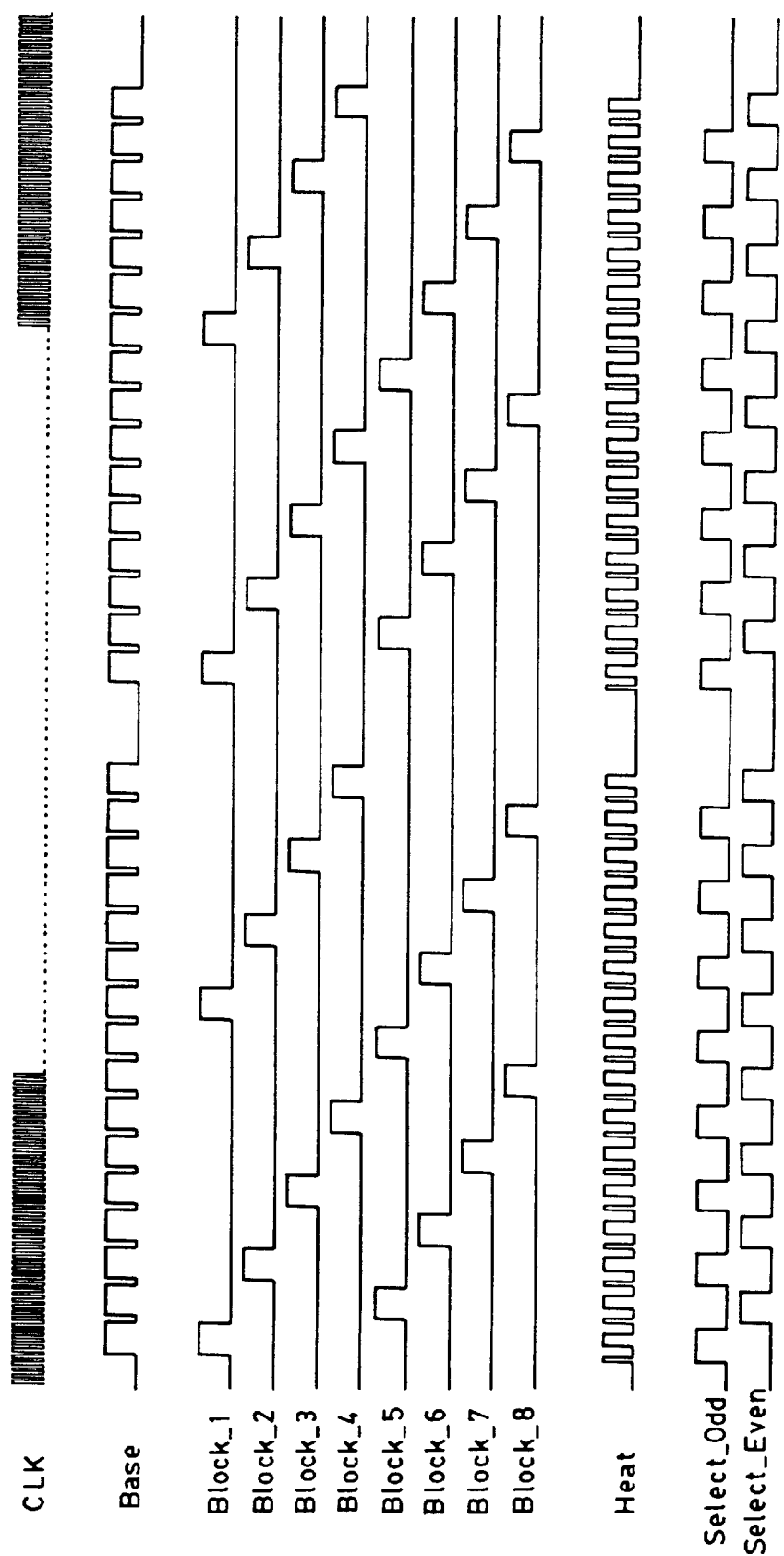
FIG. 6 is a waveform diagram showing a timing of driving the recording heads when single-color recording is performed in the first embodiment of the invention.

FIG. 6 is a waveform diagram showing a timing for driving the recording heads when monochromic recording is performed in this embodiment.

As shown in FIG. 6, if each of the Heat pulse signal, the Block-1 to Block-8 pulse signals and the Select signal is high and if the data pulse signal corresponding to a printing signal is also high, the heaters are turned on to eject ink, thereby recording an image. The Select pulses correspond to the ink color, i.e., the recording head. In this case, the period of time when the Select-Odd pulse signal corresponding to odd-number nozzles is high and the period of time when the Select-Even pulse signal corresponding to even-number nozzles is high are set so as not to overlap each other. In this case, electric power (maximum power) for heating 4 heaters by the same timing is required, and electric power (average power) for heating 64 heaters (4 heaters ×16 blocks) is required with respect to one pixel width (1 recording period). The amount of electric power is minimized to reduce the load on the power source, although only one recording color is used.

Figure 2:
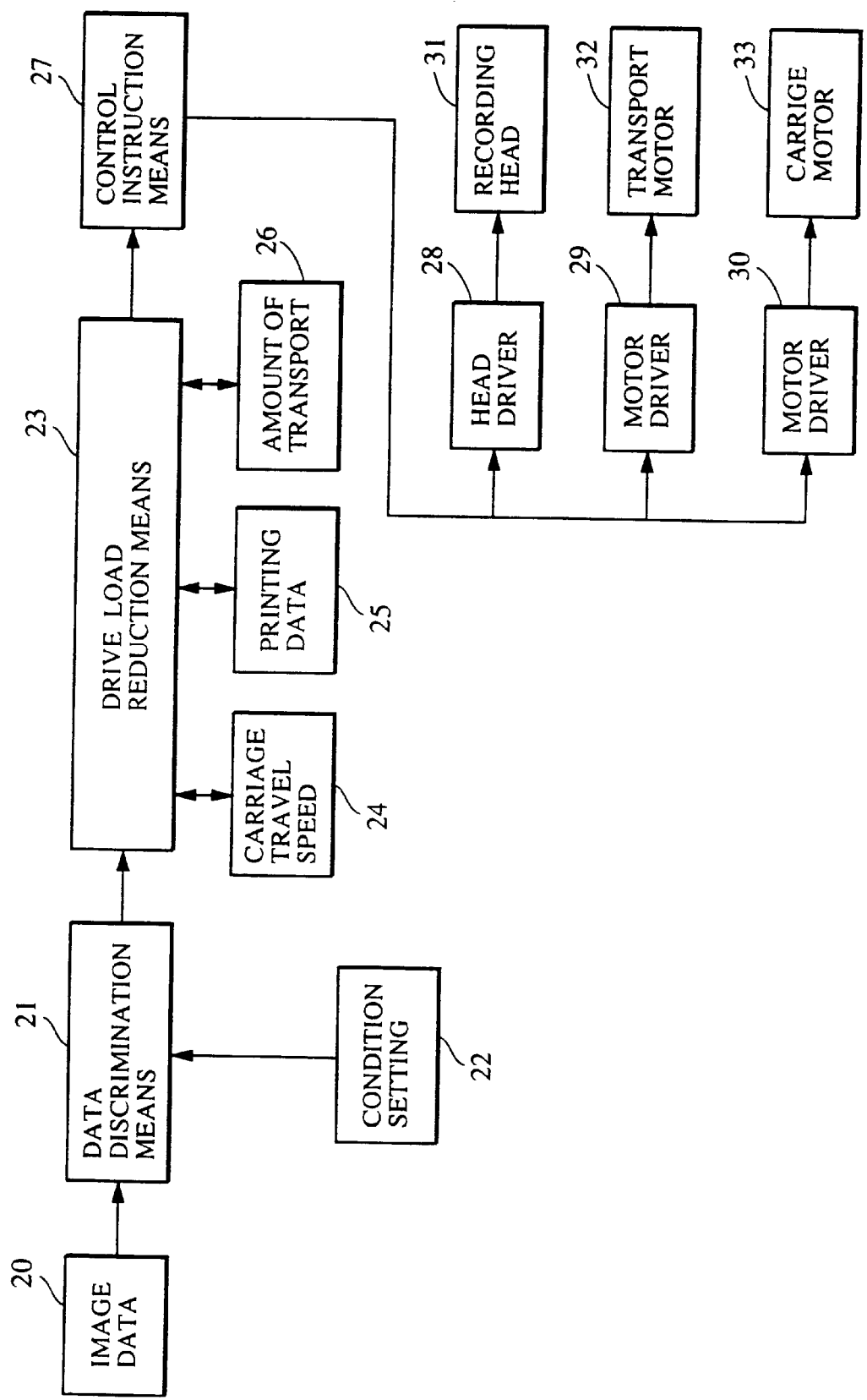
FIG. 2 is a block diagram of a recording control unit section of the recording apparatus in accordance with the first embodiment of the invention.

To further reduce the load on the power source, a recording control is performed in the apparatus of this embodiment as shown in FIG. 2.

When image data 20 is input, a data discrimination means 21 discriminates the form, color and density configurations of the image data. Discrimination conditions have been previously supplied to the data discrimination means 21 from a condition setting means 22 for setting conditions of the recording apparatus.

The condition setting means 22 may be, for example, designated information input through an operation panel of the recording apparatus or a designated signal sent from a host computer or the like along with image data.

The result of discrimination of the data discrimination means 21 is sent to a drive load reduction means 23. The drive load reduction means 23 forms a recording control signal on the basis of the discrimination signal and information on control conditions, i.e., carriage travel speed 24, printing data 25 and the amount of transport 26 of the recording member, and outputs the recording control signal to a control instruction means 27. The control instruction means 27 controls and instructs, on the basis of this recording control signal, a head driver 28 for driving a recording head 31, a motor driver 29 for driving a transfer motor 32, and a motor driver 30 for driving a carriage motor 33.

If the recording heads are driven in accordance with the drive timing of this embodiment, and if four-color recording is thereby performed, a maximum amount of electric power for heating 16 heaters and an average amount of electric power for heating 256 heaters are required, as shown in FIG. 5.

Further, if, when four-color recording is performed, the amount of image data to be recorded at one time by record-scanning is thinned out, for example, to half by the control shown in FIG. 2 so that the image is completed after two cycles of record-scanning, that is, the image is recorded in a fine mode, a maximum amount of electric power for heating 8 heaters will suffice, and an average amount of electric power for heating 128 heaters will suffice. That is, if the recording head drive timing and the recording control of this embodiment are adopted, the maximum electric power required can be reduced to ¼ of that in the conventional art, and the average electric power can be reduced to ½ of that in the case of the conventional art. Thus, the load on the power source can be greatly reduced.

To realize a smaller low-priced recording apparatus, a power source may be selected on the premise that this recording head drive timing and this recording control are adopted. In the recording apparatus of this embodiment, the power source is selected by assuming a maximum amount of electric power necessary for heating 8 heaters and an average amount of electric power for heating 128 heaters (64 heaters ×2 colors).

A voltage drop phenomenon is observed in which the voltage of the heating power becomes lower than the desired level if a plurality of heaters are heated simultaneously. If the voltage is lower than the desired level, ink cannot be ejected stably, which is undesirable in terms of image recording performance. In the conventional art, to solve this problem, the voltage input to the recording head is set to a higher value by considering a possible voltage drop, such that, even when the voltage drops, the voltage remains high enough to stably eject ink. However, if the heaters are turned on and off under such a condition, they may be driven at an excessively high voltage and a problem arises in that the life of the heaters may be reduced.

The use of the recording head driving timing and the recording control of this embodiment is also effective in extending the life of the heaters of the recording head.

The recording control of FIG. 2 for satisfying the conditions for the power source of this embodiment may be practiced, for example, in such a manner that if a multi-color image is recorded, the image is thinned out and is completed by a plurality of cycles of record-scanning, and such that, if a black-and-white image is formed or only one color is printed within the width corresponding to one scanning cycle, the control is changed to complete the image by one cycle of record-scanning. This control change may be made in accordance with a multi-color recording mode or a monochromic recording mode designated through the operation panel of the recording apparatus or by a mode change signal in a control command signal from the host computer. The recording may be one-direction recording in which an image is completed by printing in either a going or a returning direction or two-direction (bi-direction) recording in which an image is completed by printing in both the going and returning directions.

When the monochromic recording mode is designated, recorded image data may be compulsorily changed into monochromic data of a designated single color, if it originally represents a multi-color image. If the designated single color is black, all data items corresponding to colors C, M, Y and K in the image recording data are changed by logical addition processing into data of color K. In such a case, the image can always be recorded by the control of completing the image by one cycle of record-scanning.

To reduce the average electric power, a method of increasing the intervals between the times of turning on the heaters by reducing the carriage travel speed may be adopted.

Next, a control change method will be described in which a control of thinning out an image and completing the image in a plurality of cycles of record-scanning is made at the time of multi-color image recording, and another control is made to complete an image in one cycle of record-scanning at the time of black-and-white image recording.

Figure 7:
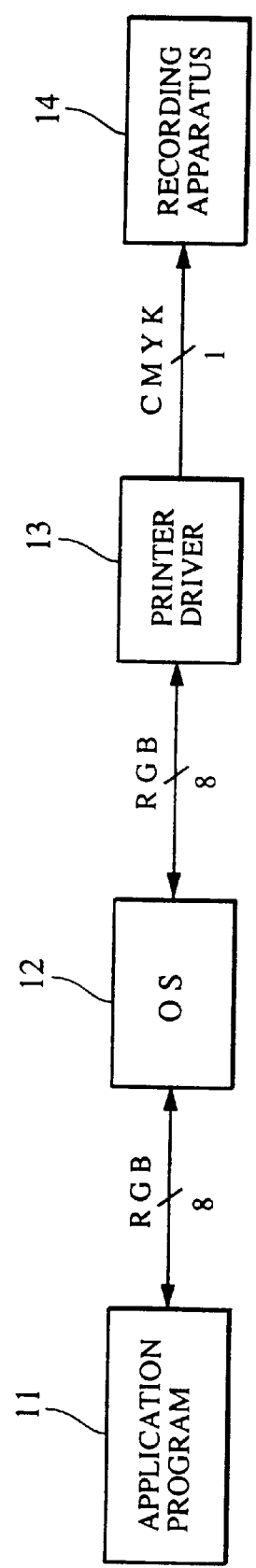
FIG. 7 is a diagram of a system in accordance with the first embodiment of the invention.

FIG. 7 is a diagram of a system configuration of this embodiment.

An application program 11 is a program which runs in an operating system (OS) 12 of the host computer to draw images such as characters and figures. A printer driver 13 is also a program for converting an image drawn on the application program 11 into image data in a format which can be recorded in the recording apparatus. Between the application program 11, the printer driver 13 and the OS 12, 8-bit signals of each of red (R), green (G) and blue (B) are exchanged as image data. From the printer driver 13 to a recording apparatus 14, a 1-bit signal is transmitted with respect to each of the colors C, M, Y and K.

Figure 8:
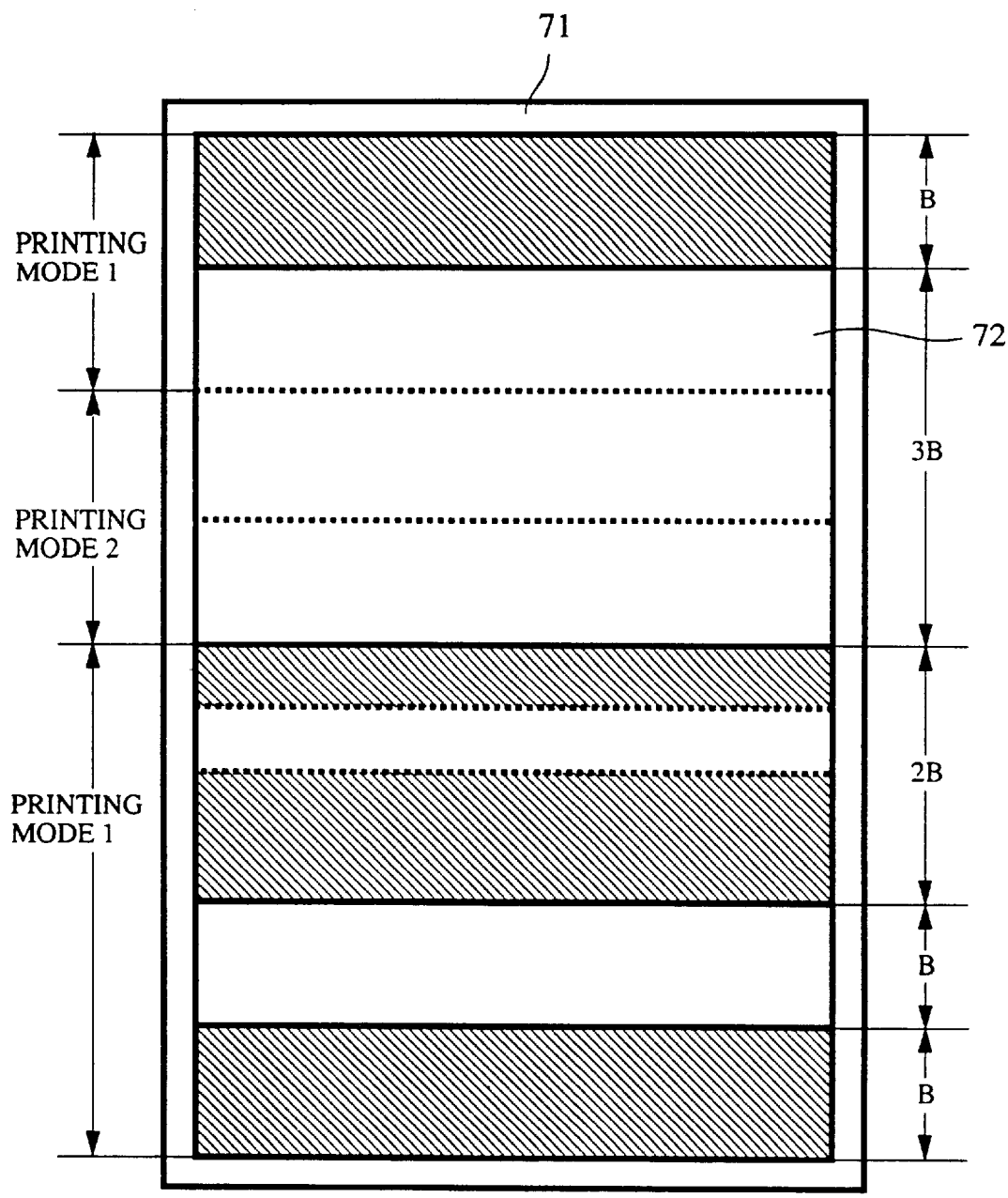
FIG. 8 is a diagram of an example of an image processed according to the first embodiment of the invention.

FIG. 8 is a diagram showing an example of an image processed in this embodiment.

Referring to FIG. 8, an image 72 is recorded on a recording member 71. Hatched areas represent image portions containing color image information, i.e., image information of at least one of C, M and Y, and white areas represent image portions of black-and-white image information containing no color image information, i.e., portions containing only image information of K. A width B corresponds to the number of ink nozzles of each recording head, and an image portion can be recorded through the width B in one scanning cycle. In this embodiment, the number of ink nozzles of each recording head is 64. Accordingly, the width B corresponds to 64 rasters (one raster corresponding to one dot line).

In image discrimination control processing of this embodiment, image information of the width B is treated as a band and the recording operation is controlled with respect to this band.

Since image data corresponding to the first width B in FIG. 8 includes color image information, the image is recorded in a printing mode 1. Image data corresponding to the next 3×B width is black-and-white information containing no color image information. The image is therefore printed in a printing mode 2 with respect to this width. However, the printing mode is not changed at the boundary between the portion containing color image information and the portion containing black-and-white image information. The printing mode is changed at the boundary between the first width-B section of the black-and-white image information portion through which black-and-white image information continues and the next width-B black-and-white image information section. The printing mode is not changed if black-and-white information does not continue out of the range corresponding to the width B from the boundary on the color image information portion. The printing mode is immediately changed at the boundary of the change from black-and-white information to color information.

In the printing mode 1, i.e., a fine mode, the recording member is transported through a distance corresponding to the width of each of recording areas defined by dividing the array of recording head nozzles by n, and n cycles of record-scanning are made to form the image by selectively using rows of nozzles divided by n with signals which are formed by masking the recording signal in correspondence with the width of the areas divided by n so that the number of recording dots formed on the recording member by ink ejected from the recording head in one scanning recording cycle is 1/n.

Figure 9:
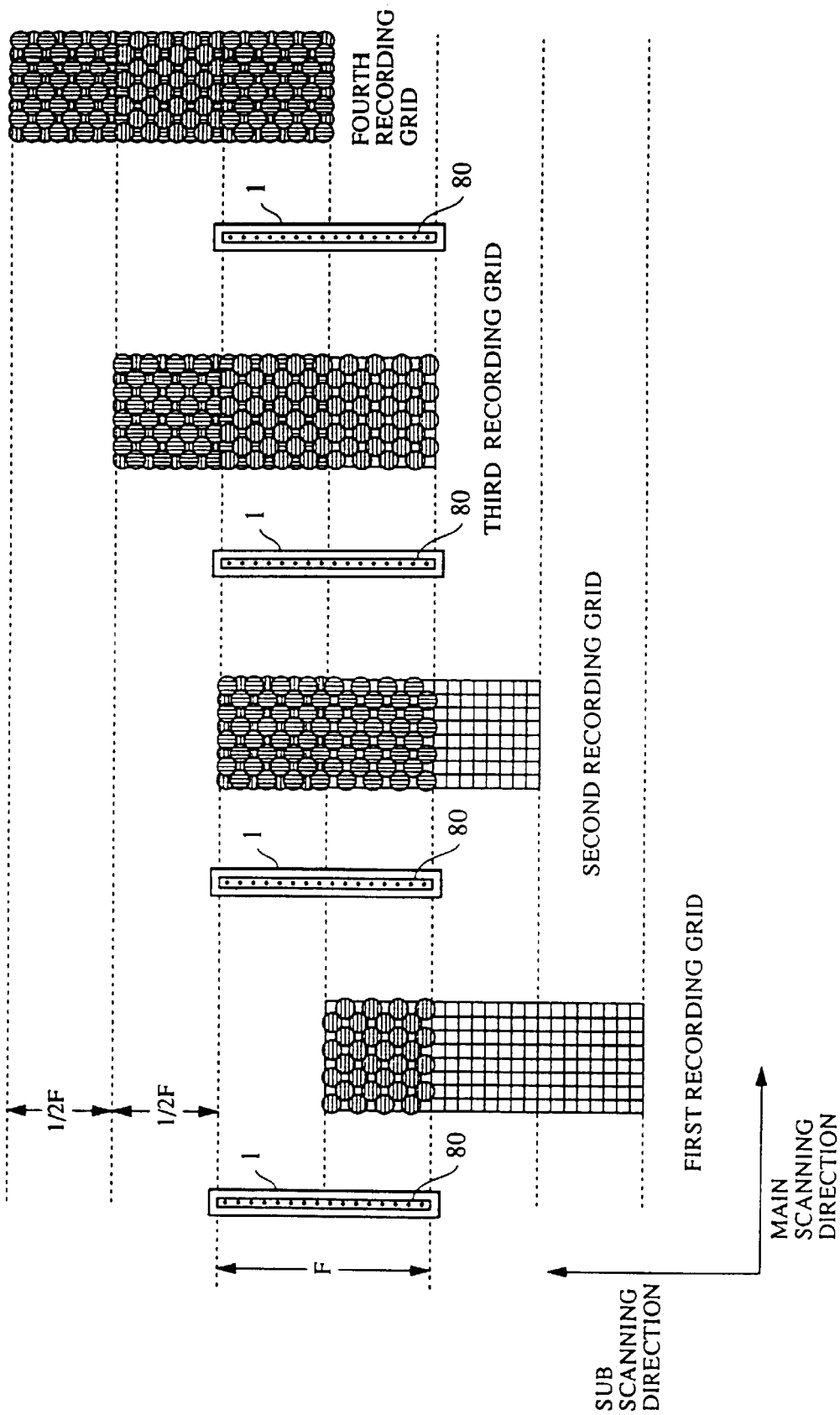
FIG. 9 is a diagram of a recording process in a printing mode of the first embodiment of the invention.

FIG. 9 is a diagram of a recording process in the printing mode 1 (fine mode) of this embodiment.

The printing process shown in FIG. 9 corresponds to a case of dividing the array of recording head nozzles by 2 (n=2). The progress of recording of an image with respect to the recording head 1 is illustrated. Marks 80 represent ink nozzles of the recording head 1. In a first cycle of record-scanning, the image recording signal is thinned out to half in a staggered manner (into a checker pattern) in accordance with a predetermined masking signal, and the image is recorded with the lower half row of recording head nozzles. In this manner, recording of a width of ½ F relative to the width F of the nozzle array of the recording head is performed. The recording member is then moved through a distance corresponding to the width of ½ F. Successively, in a second cycle of record-scanning, the image recording signal is thinned out to half in an inversely-staggered manner in accordance with the predetermined masking signal to perform recording. By this recording, an image portion corresponding to the width of ½F is completed. Then the recording member is further moved through the distance corresponding to the width of ½ F, and a third cycle of record-scanning is started. In the third record-scanning cycle, the image recording signal is thinned out to half in the staggered manner in accordance with the predetermined masking signal to perform recording. By this recording, another ½ F width image portion which was incomplete in the second record-scanning cycle is completed. Further, the recording member is moved through the distance corresponding to the width of ½F and a fourth cycle of record-scanning is performed. In the fourth record-scanning cycle, the image recording signal is thinned out to half in the inversely-staggered manner in accordance with the predetermined masking signal, and recording is performed with the upper half row of recording head nozzles. By this recording, a further ½ F width image portion which was incomplete in the third record-scanning cycle is completed, thus completing the image portion having a width of ³⁄₂ F.

The masking signal is not limited to the above-mentioned one for thinning out the recording signal in staggered and inversely-staggered manners. Any masking signal patterns may be used as long as the resulting recorded image have improved qualities. Also, a bi-directional recording method may be adopted in which recording is performed during one direction of travel of the recording head in the first and third record-scanning cycles, and in which recording is performed during the returning travel of the recording head in the opposite direction in the second and fourth record-scanning cycles. Further, a multi-pass mode may be adopted in which the second record-scanning cycle is made without moving the recording member after the first record-scanning cycle.

The printing mode 1 is a recording mode in which an image is formed by recording steps corresponding to the above-described first to fourth record-scanning cycles. The recording process in this printing mode can limit the amount of ink used for recording on the recording member at a time, and is therefore effective in reducing blurring which can occur particularly easily at a color-mixed image portion.

On the other hand, the printing mode 2 is a recording mode in which an image corresponding to the width F of the nozzle array of the recording head is recorded at one time without thinning out the image signal. This mode is advantageous because a higher recording speed can be obtained while the printing performance in this mode is substantially equal to that in the above-described printing mode 1 with respect to the qualities of a monochromic image portion. However, the qualities of a color-mixed image portion recorded in the printing mode 2 are slightly inferior because of the influence of blurring. Also in the printing mode 2, the recording speed can be improved by performing bi-directional recording.

Figure 10:
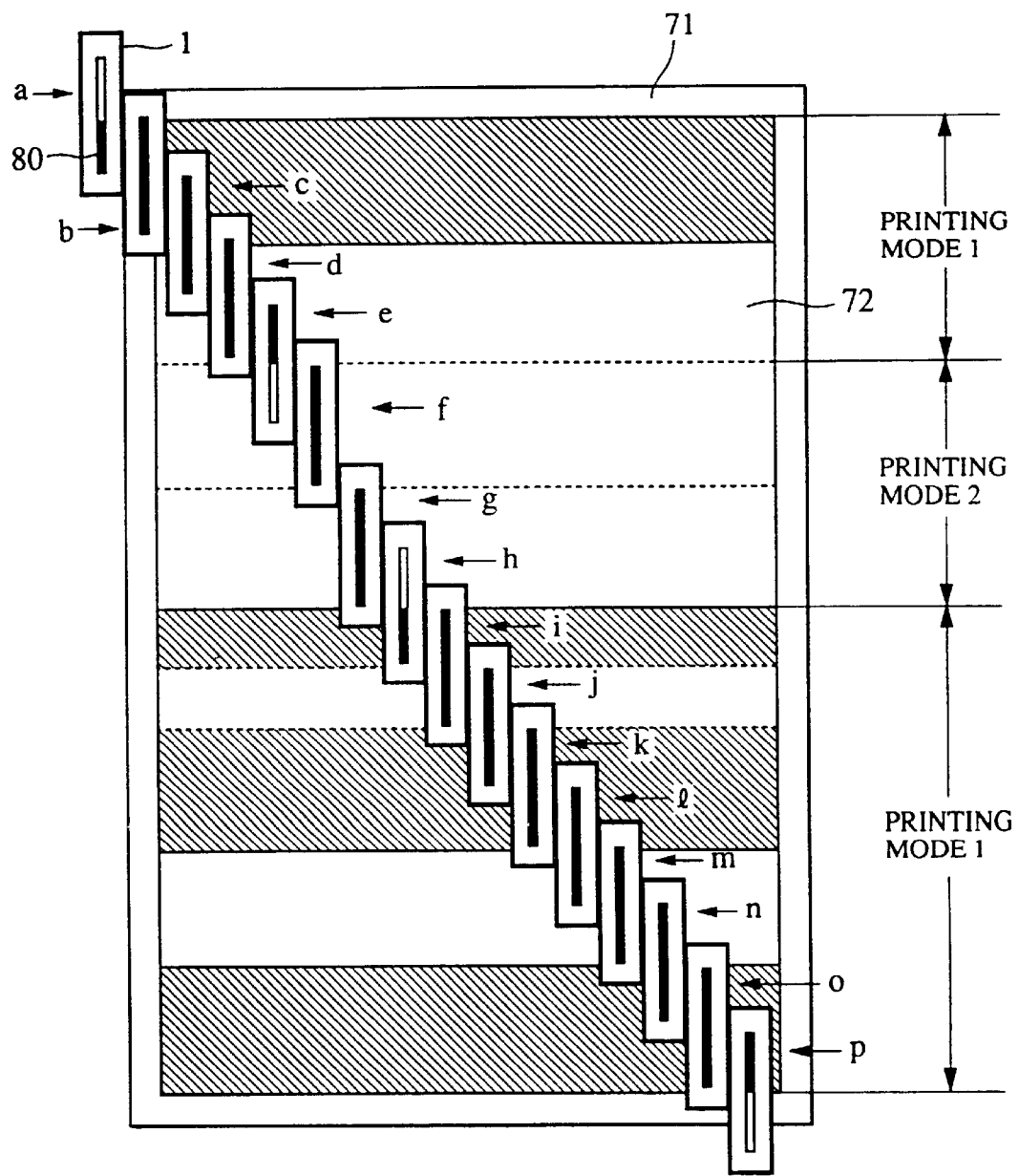
FIG. 10 is a diagram showing the relative positions of the recorded image and the recording head when the image shown in FIG. 8 is recorded using the first embodiment of the invention.
Figure 11:
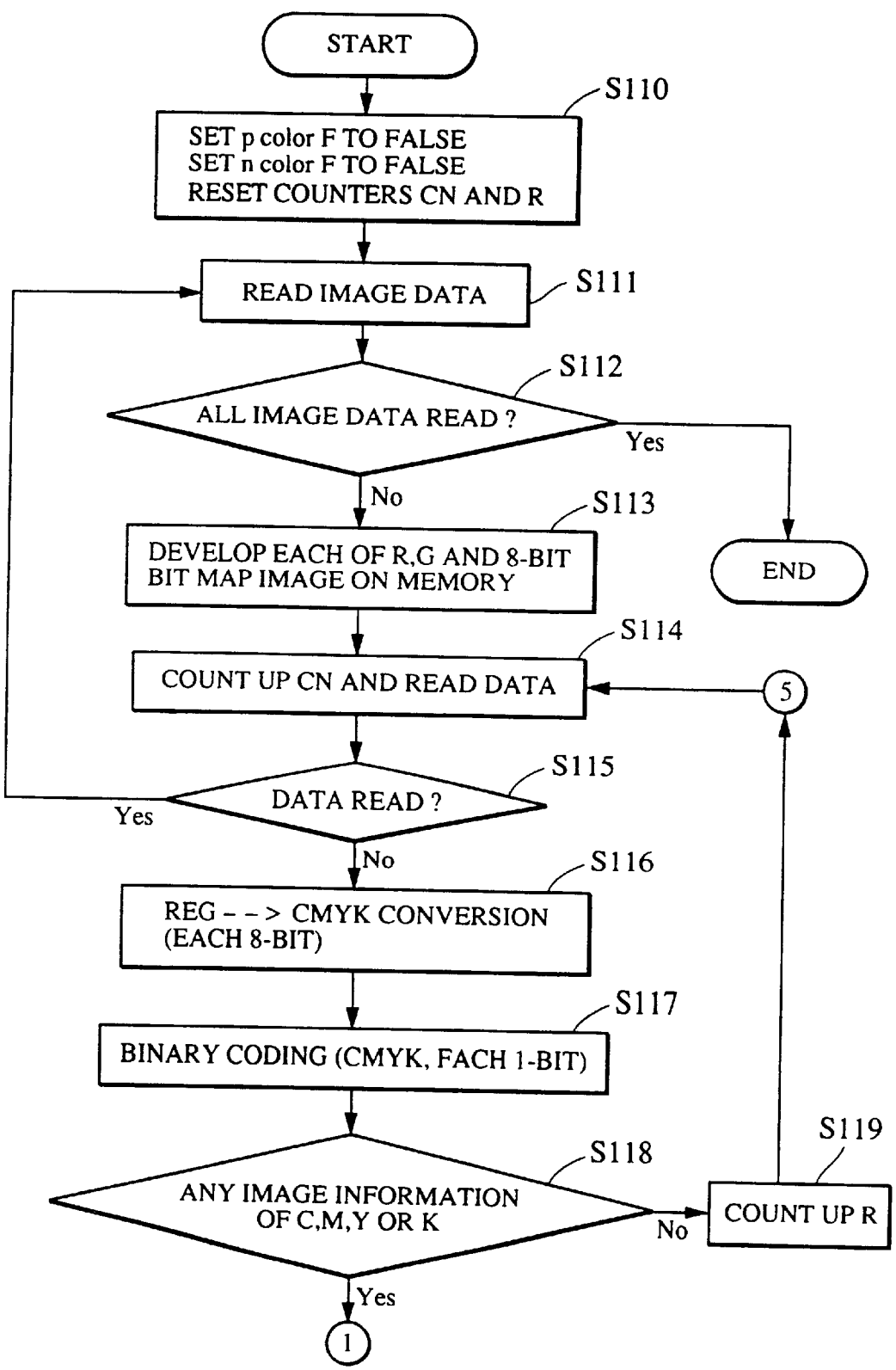
FIG. 11 is a flowchart of a discrimination control process in accordance with the first embodiment of the invention.
Figure 12:
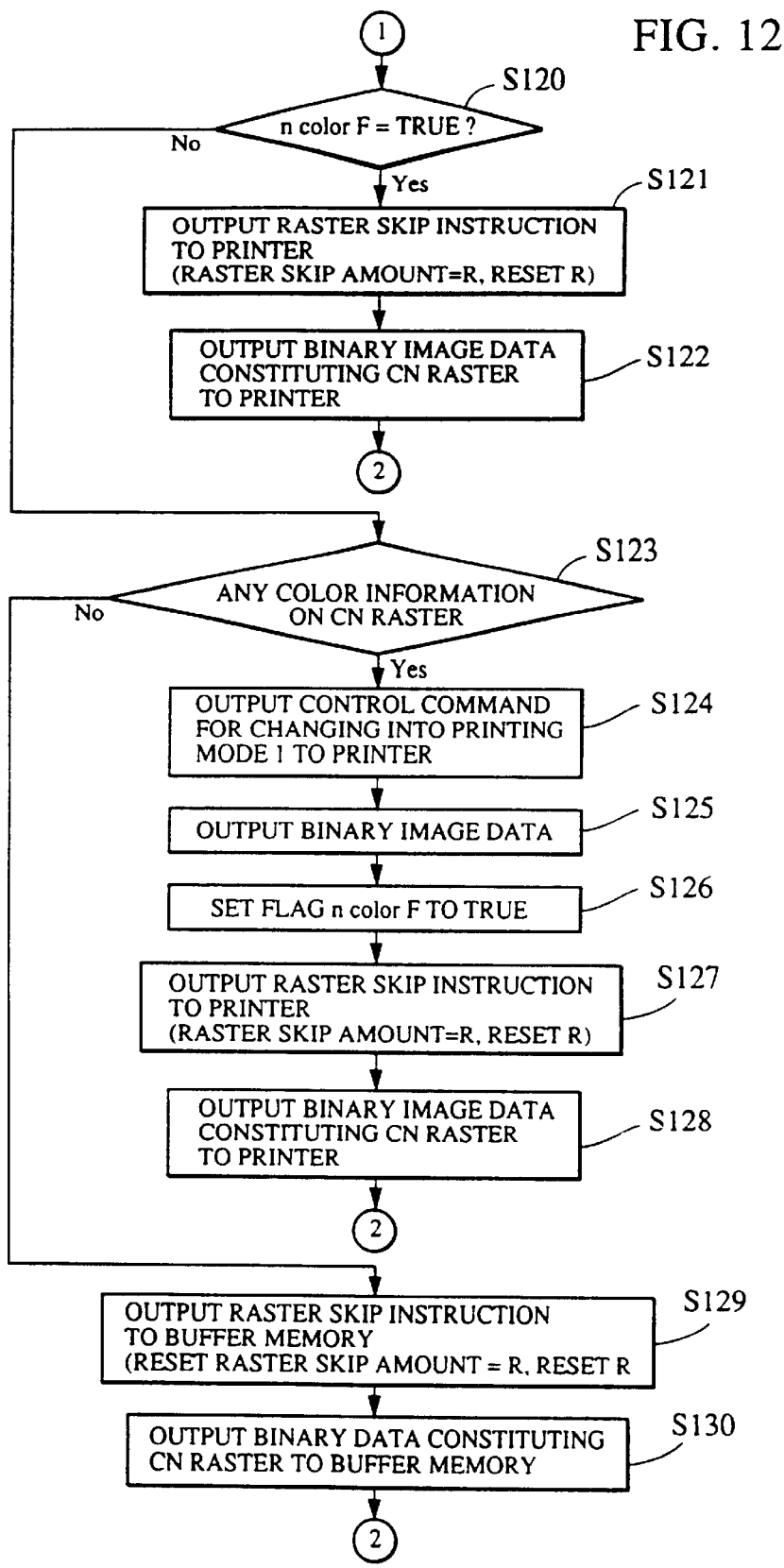
FIG. 12 is another flowchart of the discrimination control process in accordance with the first embodiment of the invention.
Figure 13:
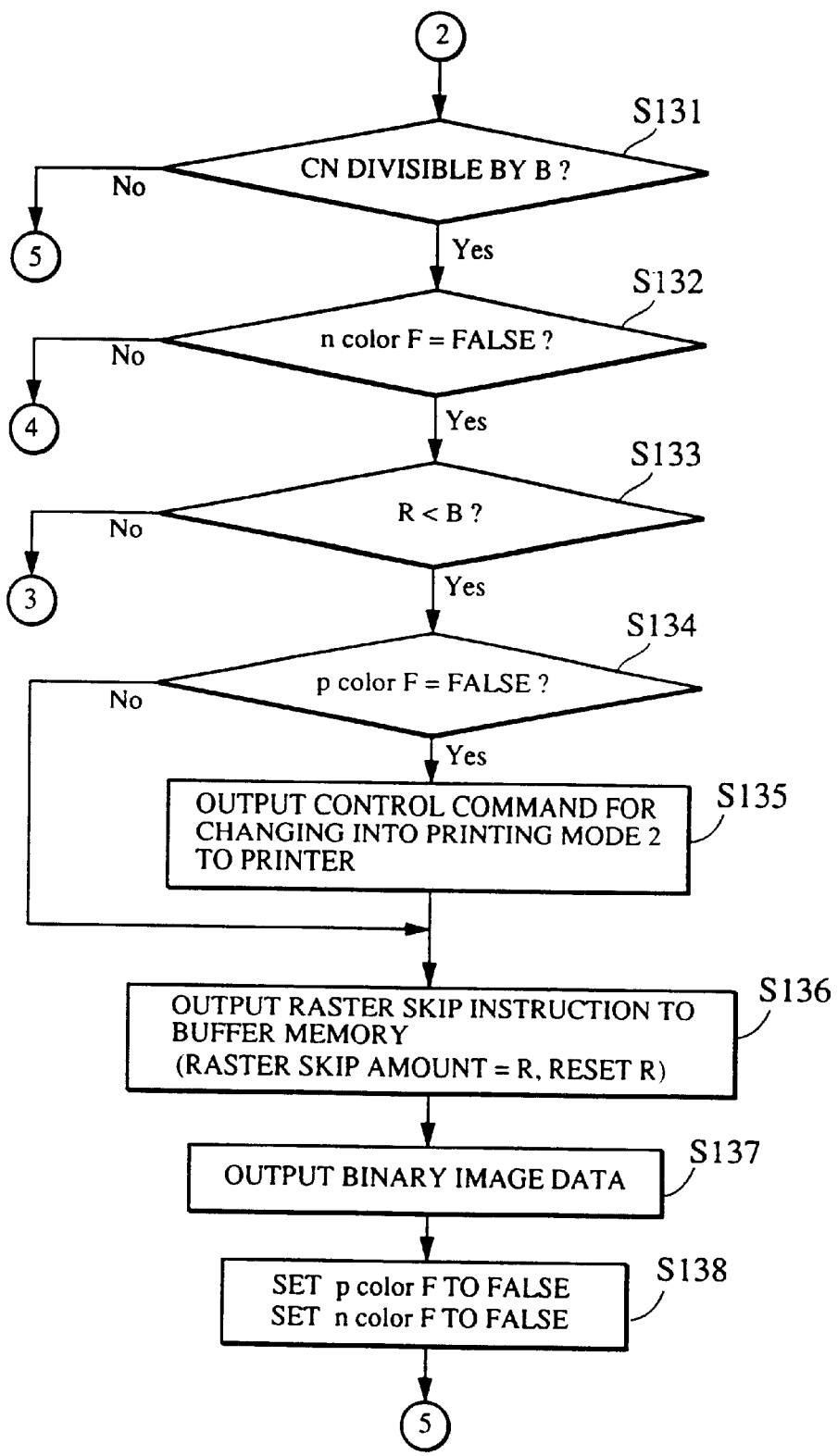
FIG. 13 is still another flowchart of the discrimination control process in accordance with the first embodiment of the invention.
Figure 14A:
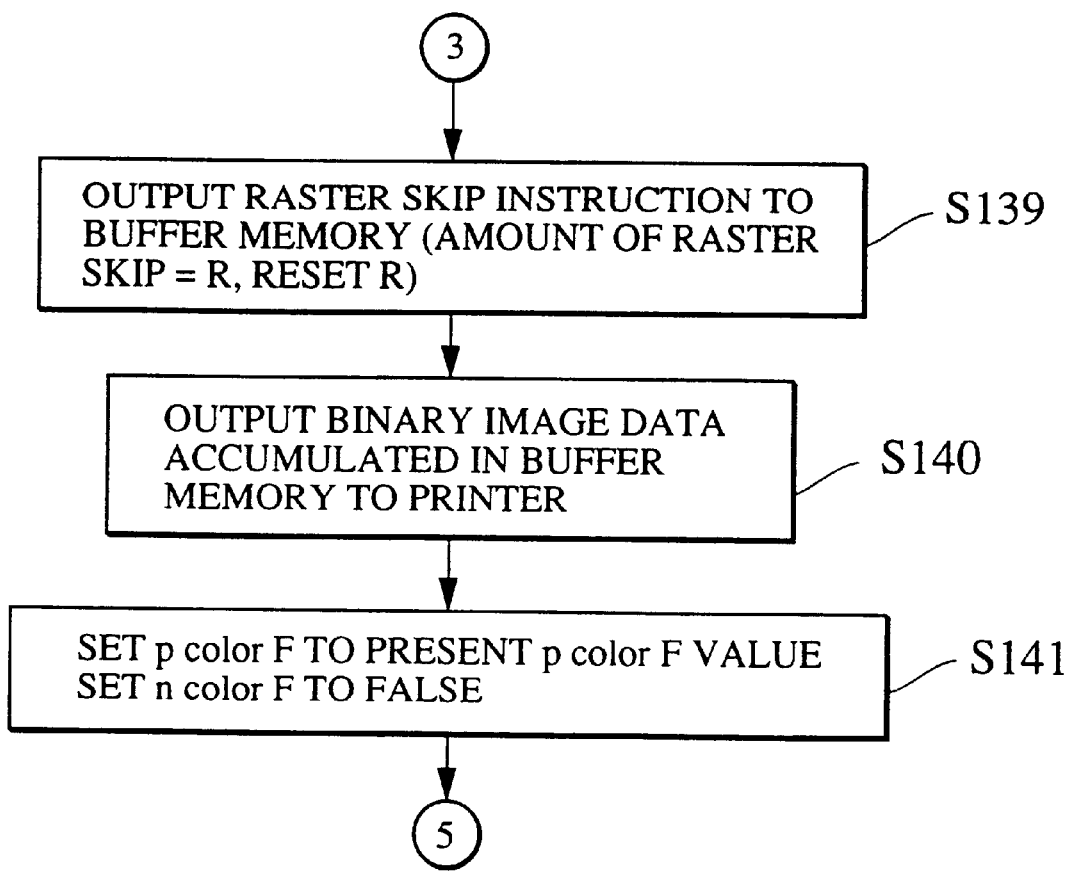
FIGS. 14A and B are further flowcharts of the discrimination control process in accordance with the first embodiment of the invention.
Figure 14B:
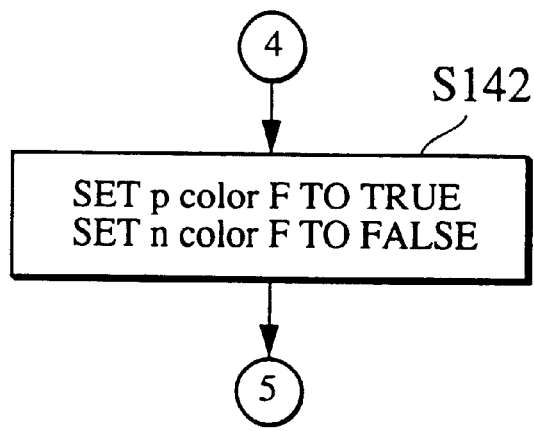

FIG. 10 is a diagram showing the relative positions of the recorded image and the recording head in the image recording shown in FIG. 8. As described above with reference to FIG. 8, recording is performed in the printing mode 1 at recording head positions a to e, and h to k, and in the printing mode 2 at positions f and g. The dots in the array of nozzles 80 represents the nozzles used for recording.

Next, an actual discrimination control process will be described. FIGS. 11 through 14B are flowcharts of the discrimination control process conducted with the printer driver 13 in this embodiment. The process described below relates to a case where the color image recording mode is selected. If the monochromic image recording mode is selected, recording is performed always in the printing mode 2. Also, if an image to be recorded is a color image when the monochromic image recording mode is selected, corresponding image data is compulsorily converted into monochromic data before being recorded.

When the program for the printer driver 13 is started, a flag pcolor F and a flag ncolor F are set to FALSE in step S110. The flag pcolor F designates color information of a band presently processed, and the flag ncolor F designates color information of a preceding band.

In general, each flag is set to FALSE to indicate that an image is presented only by black-and-white image information, and is set to TRUE to indicate that there is at least color image information. Also in step S110, counters CN and R are reset. The counter CN is a counter for counting up to determine, that is, select, one of the rasters in an image presently being processed. The counter R is a counter for determining the amount of rasters which are necessary for making a raster skip (described later) in the case where there is a white (blank) image portion in an image, i.e., a group of rasters which does not require the ejection of ink. The counter R counts up if rasters of a white image portion appear successively.

In step S111, data on an image drawn by an application program is read. If there is unprocessed image data in step S112, the process proceeds to step S113, and image data in the form of an 8-bit bit map of colors R, G and B is developed. A memory area in the host computer is used as a memory in which the image data is developed. Image data reading in step S111 and image data development processing in step S113 can be executed at sizes allowed by memory areas in the host computer. The image data may be divided with respect to a predetermined number of rasters, or an amount of image data corresponding to one page may be processed at one time.

In step S114, the counter CN is counted up and data corresponding to one present raster in the image-developed data is read. If it is determined in step S115 that there is no date to be read, the process returns to step S111.

In step S116, the image data read in step S114, i.e., an RGB luminance image signal for display on a display unit of the host computer, is converted into a CMYK density image signal (multiple value) representing the recording colors of the recording apparatus. Then, in step S117, this signal is converted into a binary CMYK image recording signal corresponding to on-off information on recording dots of the colors C, M, Y and K of the recording apparatus. The process then proceeds to step S118. In steps S116 and S117, processing for various kinds of correction or modification, such as color correction and magnification change, may be performed so to select desired images as the recording output from the recording apparatus. In step S118, a determination is made as to whether or not image information of C, M, Y or K exists. If no image information exists, the counter R is counted up in step S119 and the process returns to step S114. If image information of C, M, Y or K exists, the process proceeds to step S120.

Figure 15:
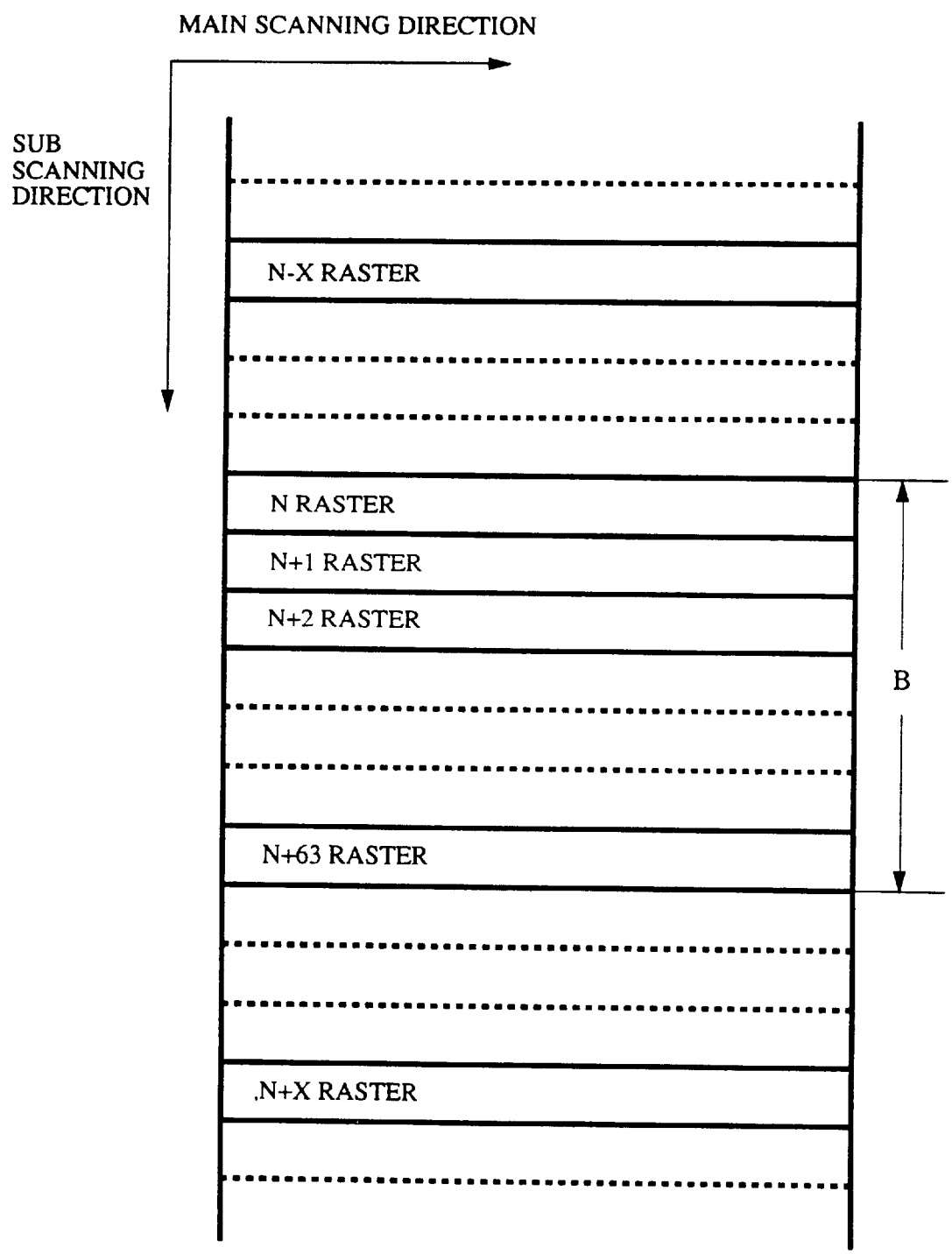
FIG. 15 is diagram showing the structure of image data.

FIG. 15 shows the structure of image data. The image data converted into binary data in step S117 is divided into rasters each corresponding to a one-dot line, and the data is successively sent to the recording apparatus from the N–raster to the N+X raster. Image information in each raster is identified before being sent to the recording apparatus to enable the recording control method for the recording apparatus to be changed. The predetermined width B (corresponding to 64 rasters in this embodiment) is divided successively from the uppermost raster.

Processing of S120 and subsequent steps will be described with respect to various conditions.

A. The Case Where Flag Ncolor F is TRUE

In this case, recording is performed by also setting printing mode 1 with respect to the present band as well as the preceding band and no mode change is effected, regardless of whether the present band represents a color image or a black-and-white image. For example, the following describes the case where the preceding band represents a color image.

1. The case where the raster presently processed has color information and is indivisible by the predetermined width B A determination is made in step S120 as to whether the flag ncolor F is TRUE. In this case, it is TRUE, and the process proceeds to step S121. In step S121, an instruction to make a raster skip corresponding to the number of rasters R having only white information and to be process-skipped is output to the recording apparatus (hereinafter referred to as "Printer"). In step S122, binary image data of the raster presently being processed is output to the printer in step S122. The process then advances to step S131. In step S131, the process returns to step S114 for processing of the next raster, since the present CNth raster is indivisible by B.

2. The case where the raster presently processed has color information and is divisible by the predetermined width B Steps S120, S121 and S122 are executed as in the foregoing case A-1 and the process advances to step S131. A determination is made in step S131 as to whether the present CNth raster is divisible by B. Since in this case the CNth raster is divisible by B, the process moves to step S132 and a determination is made as to whether the flag ncolor F is FALSE. The fact that the CNth raster is divisible by B means that processing of the present band has been completed, and setting of each flag for processing of the next band is therefore performed. Since the flag ncolor F is TRUE, the process continues to step S142 and the flag pcolor F is set to TRUE and the flag ncolor F to FALSE. The process then returns to step S114 to start processing of the next raster.

3. The case where the raster presently processed has only black-and-white information and is indivisible by the predetermined width B Steps S120, S121, S122, S131 and S114 are executed and the process shifts to processing of the next raster. That is, the same processing as that in the case A-1 is performed.

4. The case where the raster presently processed has only black-and-white information and is divisible by the predetermined width B Steps S120, S121, S122, S131, S132, S142 and S114 are executed and the process advances to processing of the next raster. That is, the same processing as that in the case A-2 is performed.

B. The Case where Flag Ncolor F is FALSE

In this case, it is possible that the printing mode is changed according to the present band, as in the case where the preceding band represents a black-and white image or the like. If the preceding band represent a black-and-white image while the present band represents a color image, mode 1 is set. If the preceding band represent a black-and-white image and if the present band also represents a black-and-white image, mode 2 is set.

1. The case where the raster presently processed has color information and is indivisible by the predetermined width B A determination is made in step S120 as to whether the flag ncolor F is TRUE. In this case, it is FALSE, and the process moves to step S123. In step S123, a determination is made as to whether there is any color information in the present raster. In this case, color information exists, and the process therefore shifts to step S124 to output a control code signal for changing to the printing mode 1 to the printer. In step S125, image data stored in a buffer is output to the printer. The flag ncolor F is set to TRUE in step S126, an instruction to effect a raster skip of the predetermined amount R is output to the printer in step S127, and binary image data of the present raster is output to the printer in step S128. Next, the process continues to step S131. It is determined in step S131 that the present CNth raster is indivisible by B, and the process therefore returns to step S114 for processing of the next raster.

Data in the buffer memory is output to the printer in step S125 in order that data stored in the buffer memory in step S130 (discussed later) be recorded. The flag ncolor F is set to TRUE in step S126 in order to inhibit storage in the buffer in step S130 of data in the subsequent section of the present band.

2. The case where the raster presently processed has color information and is divisible by the predetermined width B Steps S120, S123, S124, S125, S126, S127 and S128 are executed as in the case B-1.

The process then moves to step S131 and a determination is made as to whether the present CNth raster is divisible by B. Since in this case the CNth raster is divisible by B, the process continues to step S132 and a determination is made as to whether the flag ncolor F is FALSE. Since the flag ncolor F has been set to TRUE in step S126, the process advances to step S142 to set the flag pcolor F to TRUE and the flag ncolor F to FALSE. The process then returns to step S114 for processing of the next raster.

3. The case where the raster presently processed has only black-and-white information and is indivisible by the predetermined width B A determination is made in step S120 as to whether the flag ncolor F is TRUE. In this case, it is FALSE, and the process shifts to step S123 to make a determination as to whether there is color information in the present raster. Since in this case there is no color information, the process moves to step S129 and an instruction to effect a raster skip of the predetermined amount R is output to the buffer memory. In step S130, binary image data of the present raster is output to the buffer memory. The process then advances to step S131. Since the present CNth raster is indivisible by B, the process returns to step S114 to process the next raster.

The buffer mentioned above is a temporary data storage area prepared in the memory area in the host computer. If image data is black-and-white information, it is temporarily stored in the buffer and is transmitted to the printer if the corresponding instruction is given. The data is output to the buffer memory instead of being output directly to the printer so that the data output to the printer can be preserved until it is determined that the entire data in the present band represents a black-and-white image. The data accumulated in the buffer memory is output to the printer when the processing mode of the present band is determined by steps S125 and S140.

4. The case where the raster presently processed has only black-and-white information and is divisible by the predetermined width B Steps S120, S123, S129 and S130 are executed as in the case B-3.

The process then moves to step S131 to make a determination as to whether the present CNth raster is divisible by B. Since in this case the CNth raster is divisible by B, the process shifts to step S132 to make a determination as to whether the flag ncolor F is FALSE. In this case, it is FALSE and the process therefore continues to step S133 to make a determination as to whether the count value of the counter R is smaller than B. If the count value of the counter R is equal to or larger than B, the process advances to step S139 and an instruction to effect a raster skip of the predetermined amount R is output to the buffer memory. In step S140, image data accumulated in the buffer memory is output to the printer. In step S141, the flag pcolor F is set to the present pcolor F value while the flag ncolor F flag is set to FALSE. The process then returns to step S114 for processing of the next raster.

If in step S133 the count value of the counter R is smaller than B, the process moves to step S134. If the flag pcolor F is TRUE because, for example, the preceding raster has color image information, the process continues to step S136. In step S136, an instruction to effect a raster skip of the predetermined amount R is output to the buffer memory. In step S137, binary image data accumulated in the buffer memory is output to the printer. In step S138, the flag pcolor F and the flag ncolor F flag are set to FALSE. The process then returns to step S114 for processing of the next raster.

On the other hand, if the flag pcolor F is FALSE because, for example, the preceding band represents a black-and-white image, a control command for changing to the printing mode 2 is output to the printer in step S135, an instruction to effect a raster skip of the predetermined amount R is output to the buffer memory in step S136, and binary image data accumulated in the buffer memory is output to the printer in step S137. Next, in step S138, the flag pcolor F and the flag ncolor F are set to FALSE. The process then returns to step S114 for processing of the next raster.

In this embodiment, discrimination control is performed on the basis of a CMYK signal converted by binary coding. However, a discrimination control may be performed with an 8-bit RGB signal or an 8-bit CMYK signal.

Further, discrimination control may be performed with respect to a particular single color other than K. That is a monochromic recording or other recording recordings can be determined by setting each flag to FALSE or TRUE depending upon whether there is color information of a single color or two or more colors in one band.

The operation of this embodiment has been described with respect to various cases on the basis of tables shown in FIGS. 20A and 20B. The control techniques which are realized by performing the above-described operations are based upon performing, if the preceding band is color data, the operation in the printing mode 1 as in the case of the preceding band regardless of the state of the present band and, if the preceding band is black-and-white data, the operation in the printing mode 1 or 2 according to the present band.

In this embodiment, the printing mode is changed to mode 2 if black-and-white image bands form successively. Alternatively, the printing mode may always be changed to mode 2 with the appearance of a black-and-white image band to further increase the recording speed.

According to the present invention, as described above, the drive load is reduced by thinning out a recorded image if the recorded image is a color image, which must be recorded with a large drive load in the ordinary recording system. It is therefore possible to record a high-quality image while requiring only a limited increase in the system's power supply capacity. When a black-and-white (monochromic) image which can be recorded with a small drive load is recorded, recording is performed at a higher speed without reducing the drive load, thereby improving the throughput.

(Embodiment 2)

In a second embodiment of the present invention, image data is processed by being separated into character data consisting of character code information and image data consisting of recording dot on-off information. In the case of character data, character patterns corresponding to character code information are developed and recorded by a recording apparatus.

Figure 16:
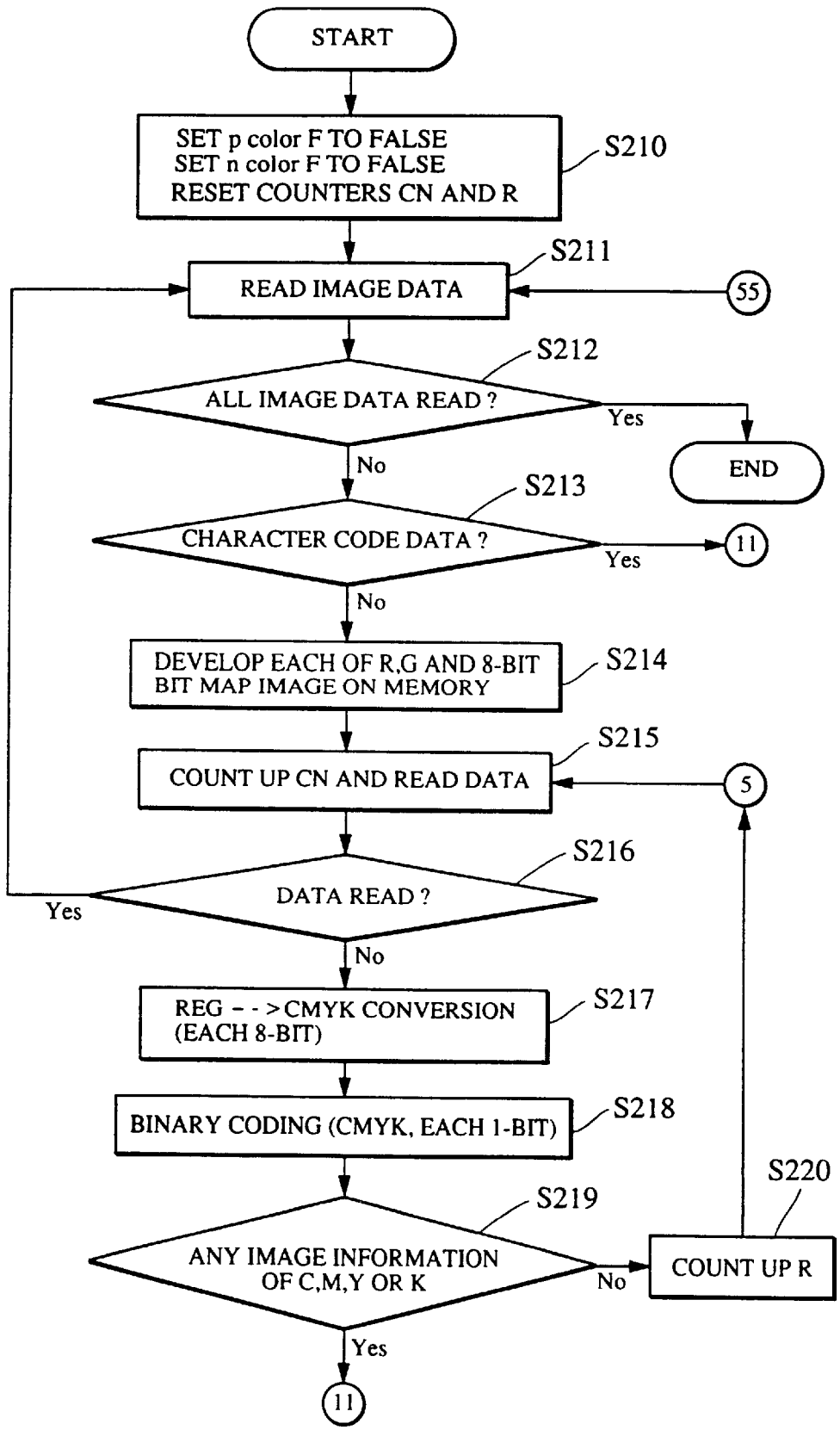
FIG. 16 is a flowchart of a discrimination control process in accordance with a second embodiment of the invention.
Figure 17:
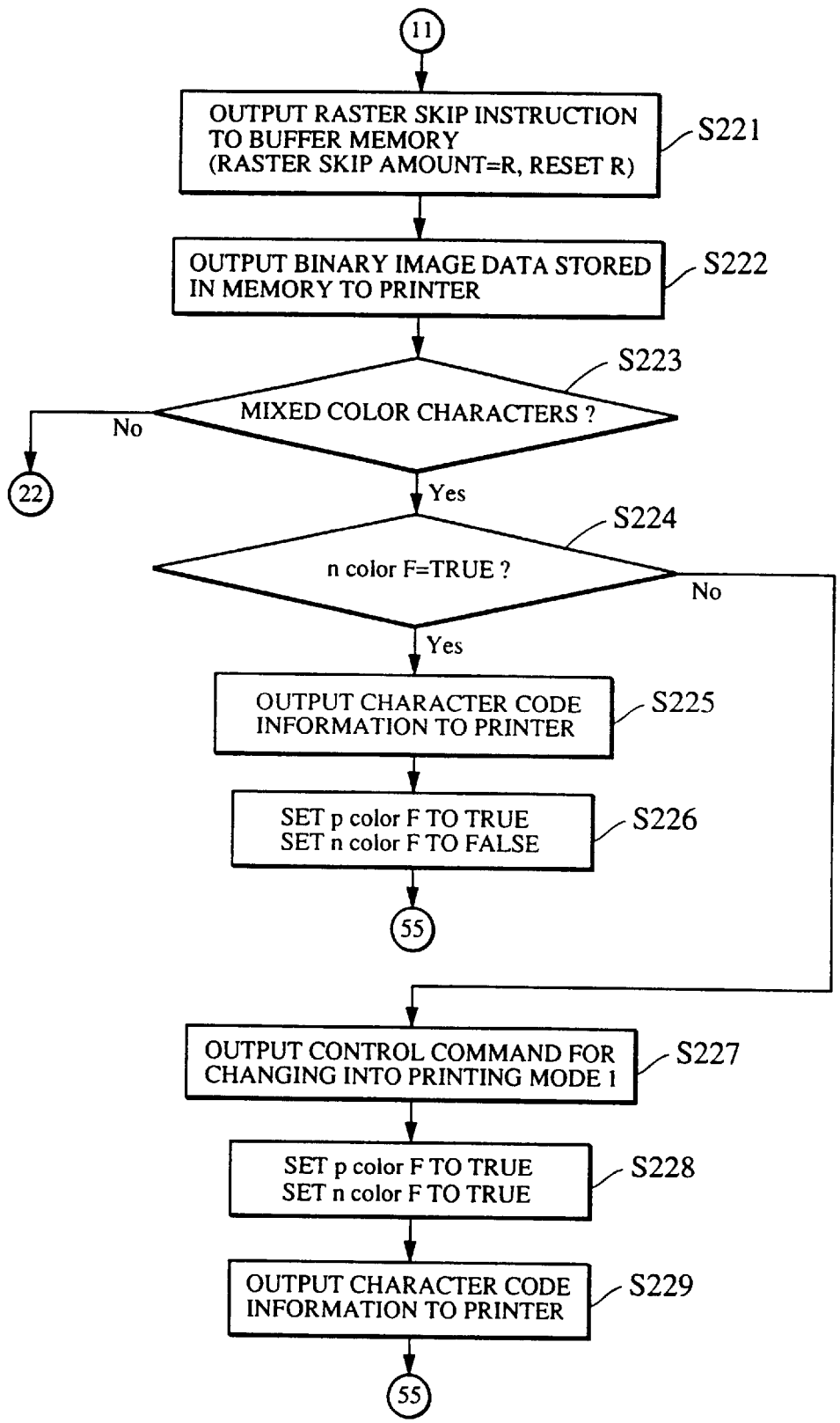
FIG. 17 is another flowchart showing the discrimination control process in accordance with the second embodiment of the invention.
Figure 18:
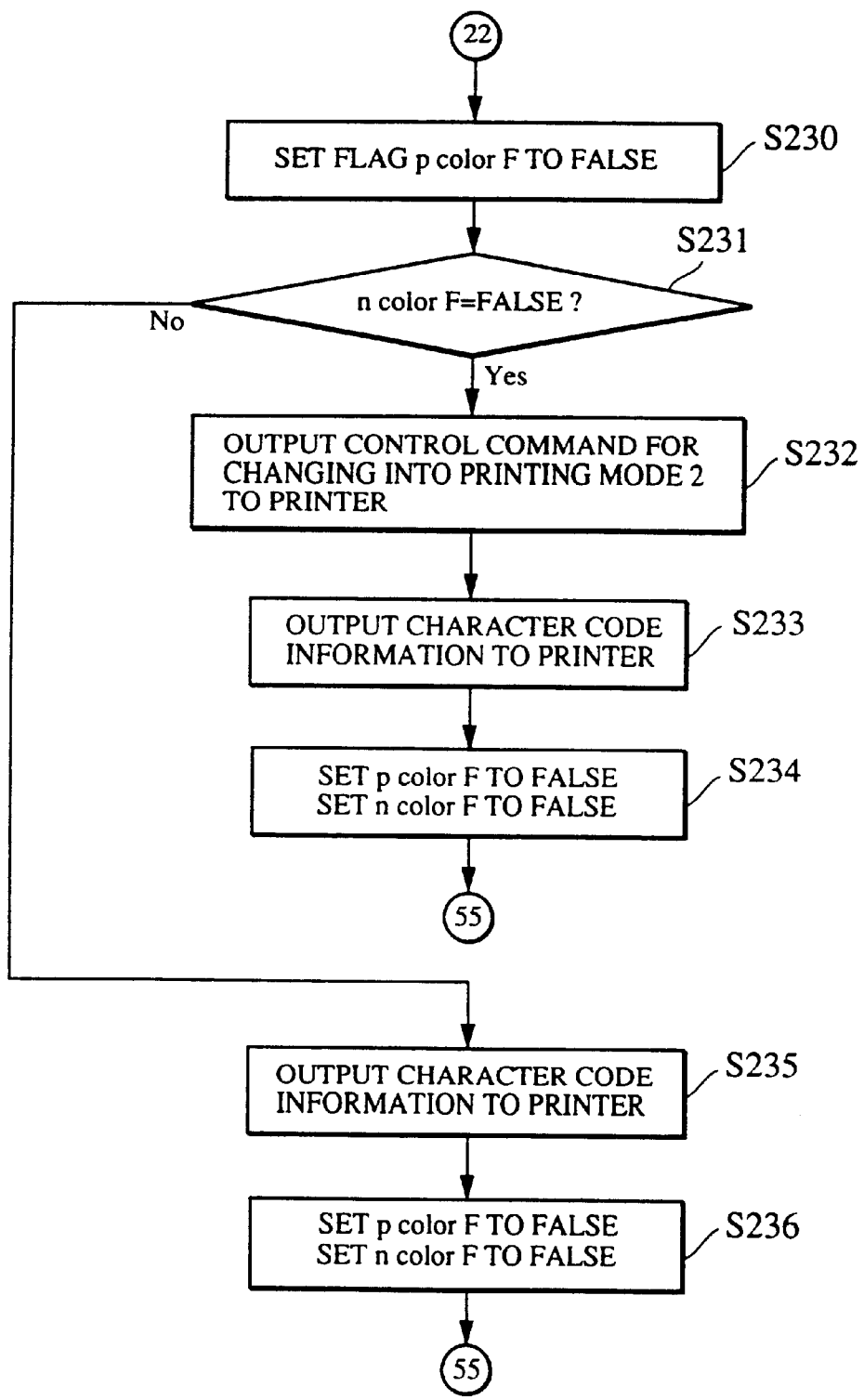
FIG. 18 is still another flowchart of the discrimination control process in accordance with the second embodiment of the invention.

FIGS. 16, 17, and 18 are flowcharts depicting discrimination processing according to this embodiment. In this embodiment, recording is performed without reducing the drive load if recorded image data is character code information and of a single color (Y, M, C, or K), and the drive load is reduced by selecting fine mode recording in other cases.

The main processing steps of this embodiment are the same as those of the above-described discrimination processing, and the processing will be described with respect to different steps.

If it is determined in step S213 that image data is character code data, the process proceeds to step S221 an instruction to effect a raster skip of the predetermined amount R is output to the buffer memory. In step S222, image data accumulated in the memory is output to the printer. This image data is developed in step S218.

If it is determined in step S223 that the characters to be printed are color-mixed characters, the process advances to step S224. If the flag ncolor F is TRUE, the character code information is immediately output to the printer in step S225, since the printing mode 1 is selected. In step S226, the flag pcolor F is set to TRUE and the flag ncolor F to FALSE. The process then returns to step S211.

If the flag n color F is FALSE in step S224, a control command for changing to the printing mode 1 is output to the printer in step S227. In step S228, each of the flags pcolor F and ncolor F is set to TRUE. In step S229, the character code information is output to the printer. The process then returns to step S211.

If it is determined in step S223 that characters to be printed are monochromic characters, the flag pcolor F is set to FALSE in step S230. If the flag ncolor F is FALSE in step S231, a control command for changing to the printing mode 2 is output to the printer in step S231. The character code information is output to the printer in step S233, and each of the flags pcolor F and ncolor F is set to FALSE in step S234. The process then returns to step S211.

If the flag n color F is TRUE in step S231, the character code information is output to the printer in step S235, and each of the flags pcolor F and ncolor F is set to FALSE in step S236. The process then returns to step S211.

In the above-described process, monochromic characters having a lower recording density can be recorded at a higher speed, and color-mixed characters or images having a higher recording density can be recorded with improved qualities while the drive load is reduced.

(Embodiment 3)

Figure 19:
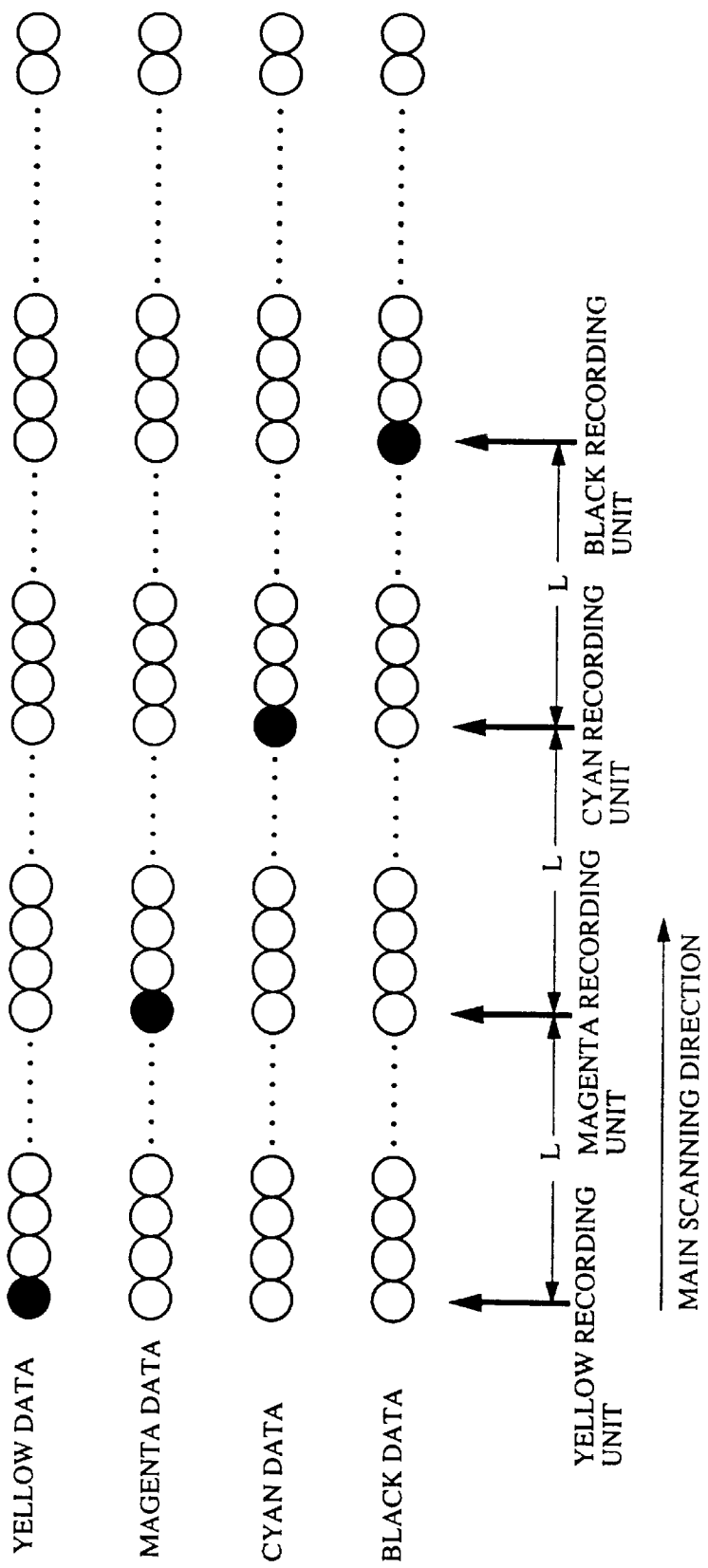
FIG. 19 is a diagram showing the relationship between image data and the recording heads.

In the first and second embodiments, the printing mode is determined according to the entire data for a band having a predetermined width. In contrast, in this embodiment, the mode is determined according to each data item in a band. FIG. 19 shows the relationship between image data and the recording heads. The ink nozzle arrays of the recording heads of yellow (Y), magenta (M), cyan (C) and black (K) are spaced apart from each other by a predetermined distance L, and groups of image data corresponding to the colors, actually used for recording by the same timing, are also shifted from each other in correspondence with L.

Accordingly, data items indicating the distance L (blacked circles in FIG. 19) are discriminated and the control conditions are changed according to whether the above-mentioned electric power conditions are satisfied. That is, recording is performed without reducing the drive load if there are no data items for simultaneously driving the heads even in the case of an image or a color image.

Each of the above-described embodiments has an effect of increasing the recording speed while maintaining suitable image qualities. Therefore, the arrangements in accordance with the embodiments of the invention are not limited to the recording control of the recording apparatus having a limited capacity power source in accordance with the present invention and can be adopted in various conventional recording apparatuses.

The above-described image data discrimination operation is performed as software processing with the printer driver. Alternatively, it may be performed in the recording apparatus.

In the above-described embodiments, the recording mode may be changed at the boundary between a color image portion and a monochromic image portion. However, it is preferable for the present invention to change the mode at such a position that the recording speed can be effectively increased.

Each embodiment of the invention has been shown as representing the arrangements of the present invention. However, the present invention should not be so limited—it also includes each of the arrangements described in the summary of the invention. Likewise, the recording means, i.e., the heads, used in the present invention are not limited to the ink jet type, and a thermal head type arrangement is also technically applicable.

According to the present invention, as is apparent from the foregoing, the time taken to perform multi-color printing or monochromic recording on a recording medium can be substantially reduced, and recorded images having improved qualities can be formed while limiting the requisite increase in the power source capacity.

The present invention is particularly suitable for use in an ink jet recording head and recording apparatus wherein thermal energy generated by an electrothermal transducer, a laser beam or the like is used to cause a change of state of the ink to eject or discharge the ink. This is because the high density of the picture elements and the high resolution of the recording are possible.

The typical structure and the operational principle of such devices are preferably the ones disclosed in U.S. Pat. Nos. 4,723,129 and 4,740,796. The principle and structure are applicable to a so-called on-demand type recording system and a continuous type recording system. Particularly, however, it is suitable for the on-demand type because the principle is such that at least one driving signal is applied to an electrothermal transducer disposed on a liquid (ink) retaining sheet or liquid passage, the driving signal being enough to provide such a quick temperature rise beyond a departure from nucleation boiling point, by which the thermal energy is provided by the electrothermal transducer to produce film boiling on the heating portion of the recording head, whereby a bubble can be formed in the liquid (ink) corresponding to each of the driving signals. By the production, development and contraction of the bubble, the liquid (ink) is ejected through an ejection outlet to produce at least one droplet. The driving signal is preferably in the form of a pulse, because the development and contraction of the bubble can be effected instantaneously, and therefore, the liquid (ink) is ejected with quick response. The driving signal in the form of the pulse is preferably such as disclosed in U.S. Pat. Nos. 4,463,359 and 4,345,262. In addition, the temperature increasing rate of the heating surface is preferably such as disclosed in U.S. Pat. No. 4,313,124.

The structure of the recording head may be as shown in U.S. Pat. Nos. 4,558,333 and 4,459,600 wherein the heating portion is disposed at a bent portion, as well as the structure of the combination of the ejection outlet, liquid passage and the electrothermal transducer as disclosed in the above-mentioned patents. In addition, the present invention is applicable to the structure disclosed in Japanese Laid-Open Patent Application No. 123670/1984 wherein a common slit is used as the ejection outlet for plural electrothermal transducers, and to the structure disclosed in Japanese Laid-Open Patent Application No. 138461/1984 wherein an opening for absorbing pressure waves of the thermal energy is formed corresponding to the ejecting portion. This is because the present invention is effective to perform the recording operation with certainty and at high efficiency regardless of the type of recording head.

In addition, the present invention is applicable to a serial type recording head wherein the recording head is fixed on the main assembly, to a replaceable chip type recording head which is connected electrically with the main apparatus and which can be supplied with the ink when it is mounted in the main assembly, or to a cartridge type recording head having an integral ink container.

The provisions of the recovery means and/or the auxiliary means for the preliminary operation are preferable, because they can further stabilize the effects of the present invention. Examples of such means include a capping means for the recording head, cleaning means therefore, pressing or sucking means, preliminary heating means which may be the electrothermal transducer, an additional heating element or a combination thereof. Also, means for effecting preliminary ejection (not for the recording operation) can stabilize the recording operation.

As regards the variation of the recording head mountable, it may be a single head corresponding to a single color ink, or may be plural heads corresponding to the plurality of ink materials having different recording colors or densities. The present invention is effectively applied to an apparatus having at least one of a monochromatic mode mainly with black, a multi-color mode with different color ink materials and/or a full-color mode using the mixture of the colors, which may be an integrally formed recording unit or a combination of plural recording heads.

Furthermore, in the foregoing embodiments, the ink has been liquid. It also may be ink material which is solid below the room temperature but liquid at room temperature. Since the ink is kept within a temperature between 30° C. and 70° C., in order to stabilize the viscosity of the ink to provide the stabilized ejection in the usual recording apparatus of this type, the ink may be such that it is liquid within the temperature range when the recording signal is the present invention is applicable to other types of ink. In one of them, the temperature rise due to the thermal energy is positively prevented by consuming it for the state change of the ink from the solid state to the liquid state. Another ink material is solidified when it is left, to prevent the evaporation of the ink. In either of the cases, in response to the application of the recording signal producing thermal energy, the ink is liquefied, and the liquefied ink may be ejected. Another ink material may start to be solidified at the time when it reaches the recording material. The present invention is also applicable to such, an ink material as is liquefied by the application of the thermal energy. Such an ink material may be retained as a liquid or solid material in through holes or recesses formed in a porous sheet as disclosed in Japanese Laid-Open Patent Application No. 56847/1979 and Japanese Laid-Open Patent Application No. 71260/1985. The sheet is faced to the electrothermal transducers. The most effective one of the techniques described above is the film boiling system.

The ink jet recording apparatus may be used as an output terminal of an information processing apparatus such as computer or the like, as a copying apparatus combined with an image reader or the like, or as a facsimile machine having information sending and receiving functions.

While the invention has been described with reference to the structures disclosed herein, it is not confined to the details set forth and this application is intended to cover such modifications or changes as may come within the purposes of the improvements or the scope of the following claims.

What is claimed is:

1. A recording apparatus which records on a recording medium by scanning with a recording means having a plurality of recording portions for recording respectively a plurality of colors, each of said recording portions corresponding to each of the colors, said apparatus comprising:

setting means for setting one of a color recording mode for recording a multi-color image and a monochromatic recording mode for recording a monochromatic image;

determining means for determining information corresponding to a drive load with which the recording means is driven for image forming on the recording medium in a predetermined time period based on recording data corresponding to a region of a scanning recording width of the recording means;

driving means for driving the recording means, the recording means being driven with a drive load, said driving means having a first recording mode for driving the recording means with a first drive load and a second recording mode for driving the recording means with a second drive load, wherein the first drive load is smaller than the second drive load; and controlling means for controlling said driving means to the first recording mode when the information corresponding to the drive load determined by said determining means indicates the drive load is of a first degree, and to the second recording mode when the information corresponding to the drive load determined by the determining means indicates the drive load is of a second degree smaller than the first degree, as a consequence of said setting means setting the color recording mode, wherein all of the recording portions are scanned simultaneously when recording on the recording medium.

2. A recording apparatus according to claim 1, wherein, in the first recording mode, recording is performed by thinning out the recording data corresponding to the region of the scanning recording width.

3. A recording apparatus according to claim 2, wherein, in the first recording mode, recording of the region of the scanning recording width is completed by a plurality of scanning cycles.

4. A recording apparatus according to claim 3, wherein, in the first recording mode, after each said scanning cycle, the recording medium is transported through a distance which is smaller than the scanning recording width.

5. A recording apparatus according to claim 1, wherein recording is performed at a speed in the second recording mode which is higher than a speed at which recording is performed in the first recording mode.

6. A recording apparatus according to claim 1, wherein, in the second recording mode, the region of the scanning recording width is completed by a single scanning cycle.

7. A recording apparatus according to claim 1, wherein said changing means changes said driving means into the second driving mode when said setting means sets the monochromic recording mode.

8. A recording apparatus according to claim 7, further comprising conversion means for converting a color data signal into a monochromic data signed when said setting means sets the monochromic recording mode.

9. A recording apparatus according to claim 1, wherein said determining means determines that the drive load is small when the data signal corresponding to an entire region of the scanning recording width during a single scanning cycle corresponds to a single color.

10. A recording apparatus according to claim 1, wherein said determining means determines that the drive load is small when the data signal corresponding to an entire region of the scanning recording width during a single scanning cycle corresponds to at most two colors.

11. A recording apparatus according to claim 1, wherein said determining means determines that the drive load is small when the data signal corresponding to an entire region of the scanning recording width during a single scanning cycle is character data.

12. A recording apparatus according to claim 1, wherein said determining means determines that the drive load is small when at least two of the recording portions of the plural colors in the recording means are not driven simultaneously by the data signal corresponding to an entire region of the scanning recording width during a single scanning cycle.

13. A recording apparatus according to claim 1, wherein said driving means drive the recording means in a one of a going direction and a returning direction.

14. A recording apparatus according to claim 1, wherein said driving means drive the recording means in both a going direction and a returning direction.

15. A recording apparatus according to claim 1, wherein the recording means ejects an ink.

16. A recording apparatus according to claim 15, wherein the recording means ejects the ink by using thermal energy.

17. A method of recording on a recording medium by scanning with recording means having a plurality of heads for recording a plurality of colors, comprising the steps of:

setting one of a color recording mode for recording a multi-color image and a monochromatic recording mode for recording a monochromatic image;

determining information corresponding to a drive load with which the recording means is driven in a predetermined time period based on a recording data corresponding to a region of a scanning recording width of the recording means; and driving the recording means in a first recording mode with a first drive load when the color recording mode is set by said setting step, and when it is determined in said determination step that the drive load is large, or in a second recording mode for driving with a second drive load, wherein the first drive load is smaller than the second drive load when the color recording mode is set, and when it is determined that the drive load is small.

18. A recording method according to claim 17, wherein, in the first recording mode, recording is performed by thinning out the recording data corresponding to the region of the scanning recording width.

19. A recording method according to claim 18, wherein, in the first recording mode, recording of the region of the scanning recording width is completed by a plurality of scanning cycles.

20. A recording method according to claim 19, wherein, in the first recording mode, after each said scanning cycle, the recording medium is transported through a distance which is smaller than the scanning recording width.

21. A recording method according to claim 17, wherein recording is performed at a speed in the second recording mode which is higher than a speed at which recording is performed in the first recording mode.

22. A recording method according to claim 17, wherein, in the second recording mode, the region of the scanning recording width is completed by a single scanning cycle.

23. A recording method according to claim 17, wherein it is determined in said determining step that the drive load is small when the data signal corresponding to an entire region of the scanning recording width during a single scanning cycle corresponds to a single color.

24. A recording method according to claim 17, wherein it is determined in said determining step that the drive load is small when the data signal corresponding to an entire region of the scanning recording width during a single scanning cycle corresponds to at most two colors.

25. A recording method according to claim 17, wherein it is determined in said determining step that the drive load is small when the data signal corresponding to an entire region of the scanning recording width during a single scanning cycle is character data.

26. A recording method according to claim 17, wherein it is determined in said determining step that the drive load is small when at least two of the recording portions of the plural colors in the recording means are not driven simultaneously by the data signal corresponding to an entire region of the scanning recording width during a single scanning cycle.

27. A recording method according to claim 17, wherein in said driving step the recording means is driven in a one of a going direction and a returning direction.

28. A recording method according to claim 17, wherein in said driving step the recording means is driven in both a going direction and a returning direction.

29. A recording method according to claim 17, wherein the recording means ejects an ink.

30. A recording method according to claim 29, wherein the recording means ejects the ink by using thermal energy.

31. A recording method according to claim 17, wherein in said driving step the recording means is driven in the second recording mode when setting the monochromic recording mode.

32. A recording method according to claim 31, further comprising the step of converting a color data signal into a monochromic data signal when setting the monochromic recording mode.

33. A method of recording on a recording medium by scanning with recording means having a plurality of heads for a plurality of colors, comprising the steps of:

setting one of a color recording mode for recording a multi-color image and a monochromatic recording mode for recording a monochromatic image;

determining information corresponding to a drive load with which the recording means is driven in a predetermined time period over each of a first region of a scanning recording width of the recording means and a second region adjacent to the first region based on a recording data corresponding to the first and the second regions; and driving the recording means in a first recording mode for driving with a first drive load with respect to the second region when the color recording mode is set by said setting step, and when it is determined in said determination step that the drive load with respect to the second region is large, or in a second recording mode for driving with a second drive load, wherein the first drive load is smaller than the second drive load.

34. A recording method according to claim 33, wherein in said driving step the recording means is driven in the second recording mode when the monochromic recording mode is set in said setting step.

35. A method of controlling the recording operation of a recording apparatus for recording on a recording medium by scanning with recording means having a plurality of heads for recording a plurality of colors, comprising the steps of:

setting one of a color recording mode for recording a multi-color image and a monochromatic recording mode for recording a monochromatic image;

determining information corresponding to a drive load with which the recording means is driven in a predetermined time period based on a recording data corresponding to a region of a scanning recording width of the recording means; and driving the recording means in a first recording mode for driving with a first drive load when the color recording mode is set by said setting step, and when it is determined in said determination step that the drive load is large, or in a second recording mode for driving with a second drive load, wherein the first drive load is smaller than the second drive load.

36. A recording method according to claim 35, wherein in said driving step the recording means is driven in the second recording mode when the monochromic recording mode is set in said setting step.

37. A method of reducing a drive load for image forming on a recording medium in a predetermined time period by scanning with a recording means having a plurality of recording portions for recording respectively a plurality of colors, each said recording portion corresponding to each of the colors, comprising the steps of:

setting one of a color recording mode for recording a multi-color image and a monochromatic mode for recording a monochromatic image;

determining a drive load with which the recording means is driven for image forming on the recording medium in a predetermined time period based on recording data corresponding to a region of a scanning recording width of the recording means; and driving the recording means in a first recording mode for driving in which the drive load on the recording means is reduced when both the color recording mode has been set in said setting step and it is determined in said determining step that the drive load is large, or in a second recording mode for driving in which the load on the recording means is not reduced when both the color recording mode is set and it is determined that the drive load is smaller than the drive load driven in said first recording mode, wherein all of the recording portions are scanned simultaneously when recording on the recording medium.

38. A recording apparatus which records on a recording medium by scanning with a recording means having a plurality of recording portions for recording respectively a plurality of colors, each of said recording portions corresponding to each of the colors, said apparatus comprising:

acquiring means for acquiring information corresponding to a drive load with which the recording means is driven for image forming on the recording medium in a predetermined time period based on a recording data corresponding to a region of a scanning recording width of the recording means;

driving means for driving the recording means, the recording means being driven with a drive load, said driving means having a first recording mode for driving the recording means with a first drive load and a second recording mode for driving the recording means with a second drive load wherein the first drive load is smaller than the second drive load; and controlling means for controlling the driving means to the first recording mode when the information corresponding to the drive load acquired by said acquiring means indicates the drive load is of a first degree, and to the second recording mode when the information corresponding to the drive load acquired by said acquiring means indicates the drive load is of a second degree smaller than the first degree, when a multi-color image is recording by the recording means, wherein all of the recording portions are scanned simultaneously when recording on the recording medium.

39. A method of recording on a recording medium by scanning with a recording means having a plurality of recording portions for recording respectively a plurality of colors, each of said recording portions corresponding to each of the colors, comprising the steps of;

acquiring information corresponding to a drive load with which the recording means is driven for image forming on the recording medium in a predetermined time period based on a recording data corresponding to a region of a scanning recording width of the recording means; and driving the driving means in a first recording mode for driving the recording means with a first drive load when a color recording mode for recording a multi-color image is set, and when the information corresponding to the drive load acquired by said acquiring means indicates the drive load is of a first degree, or in a second recording mode for driving the recording means with a second drive load when a color recording mode for recording a multi-color image is set, and when the information corresponding to the drive load acquired by said acquiring means indicates the drive load is of a second degree smaller than the first degree, wherein all of the recording portions are scanned simultaneously when recording on the recording medium.

* * * * *

UNITED STATES PATENT AND TRADEMARK OFFICE
CERTIFICATE OF CORRECTION

PATENT NO. : 6,302,520 B1
DATED : October 16, 2001
INVENTOR(S) : Yuji Akiyama et al.

It is certified that error appears in the above-identified patent and that said Letters Patent is hereby corrected as shown below:

Column 1,
Line 13, "sheet a" should read -- sheet or a --.

Column 3,
Line 65, "B" should read -- 14B --.

Column 9,
Line 36, "have" should read -- has --.

Column 11,
Line 30, "Printer")." should read -- "printer"). --.

Column 12,
Line 1, "represent" should read -- represents --; and
Line 3, "represent" should read -- represents --.

Column 16,
Line 67, "is" should read -- in --.

Column 18,
Line 45, "drive" should read -- drives -- and "one" should read -- one --; and
Line 48, "drive" should read -- drives --.

Column 19,
Linr 48, "a one" should read -- one --.

Signed and Sealed this

Seventh Day of May, 2002

*Attest:*

*Attesting Officer*

JAMES E. ROGAN
*Director of the United States Patent and Trademark Office*